(12) United States Patent
Nakagawa et al.

(10) Patent No.: US 12,103,518 B2
(45) Date of Patent: Oct. 1, 2024

(54) PARKING ASSIST APPARATUS

(71) Applicant: TOYOTA JIDOSHA KABUSHIKI KAISHA, Toyota (JP)

(72) Inventors: Takuya Nakagawa, Nagoya (JP); Tsutomu Mochida, Shizuoka-ken (JP); Naoya Matsunaga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/549,326

(22) Filed: Dec. 13, 2021

(65) Prior Publication Data

US 2022/0203968 A1 Jun. 30, 2022

(30) Foreign Application Priority Data

Dec. 24, 2020 (JP) ................. 2020-214967

(51) Int. Cl.
*B60W 30/06* (2006.01)
*B60W 10/04* (2006.01)
*B60W 10/18* (2012.01)
*B60W 10/20* (2006.01)

(52) U.S. Cl.
CPC ............ *B60W 30/06* (2013.01); *B60W 10/04* (2013.01); *B60W 10/18* (2013.01); *B60W 10/20* (2013.01); *B60W 2554/801* (2020.02); *B60W 2554/802* (2020.02)

(58) Field of Classification Search
CPC ...... B60W 30/06; B60W 10/04; B60W 10/18; B60W 10/20; B60W 2554/801; B60W 2554/802; B60W 40/02; B62D 15/0285

USPC .......................................................... 701/25
See application file for complete search history.

(56) References Cited

U.S. PATENT DOCUMENTS

| | | | |
|---|---|---|---|
| 2017/0015312 A1* | 1/2017 | Latotzki | B62D 15/027 |
| 2017/0028984 A1* | 2/2017 | Kiyokawa | G01S 15/931 |
| 2017/0029028 A1* | 2/2017 | Kiyokawa | G08G 1/168 |
| 2017/0066444 A1* | 3/2017 | Habu | G05D 1/0246 |
| 2018/0208245 A1* | 7/2018 | Mizutani | B60W 30/06 |
| 2018/0257665 A1* | 9/2018 | Sannodo | B60W 30/06 |
| 2019/0176813 A1* | 6/2019 | Yamada | B60W 30/06 |
| 2019/0351900 A1 | 11/2019 | Matsuda et al. | |
| 2020/0001864 A1* | 1/2020 | Oyama | B60W 10/20 |
| 2020/0331462 A1* | 10/2020 | Kurosawa | B60W 30/06 |

FOREIGN PATENT DOCUMENTS

| | | | |
|---|---|---|---|
| JP | 2012-217000 A | | 11/2012 |
| JP | 2013-021468 A | | 1/2013 |
| JP | 2015003565 A | * | 1/2015 |
| JP | 2015-174586 A | | 10/2015 |
| WO | 2018/168512 A1 | | 9/2018 |

* cited by examiner

*Primary Examiner* — Angela Y Ortiz
*Assistant Examiner* — Jean W Charleston
(74) *Attorney, Agent, or Firm* — Sughrue Mion, PLLC

(57) ABSTRACT

A parking assist apparatus sets a target position on a traffic lane, based on vehicle surrounding information, calculates a moving route, and executes a parking assist control of moving an own vehicle along the moving route. The parking assist control includes a steering angle control, a driving force control, and a braking force control. The parking assist apparatus changes the stopping number of stopping the own vehicle, based on the vehicle surrounding information while moving the own vehicle along the moving route.

7 Claims, 20 Drawing Sheets

PARKING ASSIST APPARATUS

BACKGROUND

Field

The invention relates to a parking assist apparatus which executes a parking assist control of moving a parked vehicle to a traffic lane.

Description of the Related Art

There has been proposed a parking assist apparatus which detects surrounding situation around a vehicle with surrounding sensors such as cameras and sensors mounted on the vehicle and executes a parking assist control of moving the vehicle to a target position set, depending on the detected surrounding situation (for example, see JP 2015-174586 A). The parking assist control includes a steering angle control of controlling a steering angle of the vehicle, a driving force control of controlling driving force applied to the vehicle, and a braking force control of controlling braking force applied to the vehicle.

When an own vehicle is moved or pulled out to a traffic lane by the parking assist control, objects such as pedestrians and other vehicles may approach the own vehicle from the left side and/or the right side of the own vehicle. Therefore, the own vehicle may be stopped several times while the parking assist control is being executed. Thereby, a driver of the own vehicle may have chances to confirm a situation of the traffic lane. In this regard, the own vehicle may be stopped even when the driver has already confirmed the situation of the traffic lane. In this case, the driver may feel bothersome.

SUMMARY

The invention has been made for solving the aforementioned problems. An object of the invention is to provide a parking assist apparatus which can change the stopping number of stopping the own vehicle, depending on the surrounding situation around the own vehicle while the parking assist control is being executed.

A parking assist apparatus according to the invention comprises an information acquiring apparatus and an electronic control unit. The information acquiring apparatus acquires vehicle surrounding information including information on objects around an own vehicle which is parked. The electronic control unit is configured to, in response to an assistance request being generated, set a target position on a traffic lane to which the electronic control unit moves the own vehicle, based on the vehicle surrounding information. Further, the electronic control unit is configured to calculate a moving route along which the electronic control unit moves the own vehicle from a current position of the own vehicle to the target position. Furthermore, the electronic control unit is configured to execute a parking assist control of moving the own vehicle along the moving route.

According to the invention, the parking assist control includes (i) a steering angle control of changing a steering angle of the own vehicle, (ii) a driving force control of controlling driving force of the own vehicle, and (iii) a braking force control of controlling braking force of the own vehicle.

Further, the electronic control unit is configured to change the stopping number of stopping the own vehicle, based on the vehicle surrounding information while the electronic control unit moves the own vehicle along the moving route.

With the invention, the parking assist apparatus can prevent the driver from feeling bothersome and provide the driver with changes to confirm the situation of the traffic lane.

According an aspect of the invention, the electronic control unit may be configured to detect a first object to a first side of the own vehicle, based on the vehicle surrounding information, the first side being one of the right side and the left side of the own vehicle and detect a second object to a second side of the own vehicle, based on the vehicle surrounding information, the second side being the other of the right side and the left side of the own vehicle. In this aspect, the electronic control unit may be configured to change the stopping number, based on a positional relationship between (i) a vehicle end portion which is an end portion of the own vehicle at the side of the traffic lane, (ii) a first end portion which is an end portion of the first object at the side of the traffic lane, and (iii) a second end portion which is an end portion of the second object at the side of the traffic lane.

According to another aspect of the invention, the electronic control unit may be configured to set the stopping number to two when the electronic control unit determines, based on the positional relationship, that a current situation is a first situation. In this case, the first situation may include a situation that (i) the first object and the second object interrupt a field of view from the own vehicle, and (ii) a distance in a longitudinal direction of the own vehicle between the first end portion and the second end portion is longer than a predetermined threshold. Further, in this case, the electronic control unit may be configured to stop the own vehicle when the vehicle end portion reaches a position forward by a predetermined distance from the first end portion while the electronic control unit moves the own vehicle along the moving route, and stop the own vehicle when the vehicle end portion reaches a position forward by the predetermined distance from the second end portion while the electronic control unit moves the own vehicle along the moving route.

The field of view from the own vehicle corresponds to a scope on the traffic lane which can be confirmed from the own vehicle. In particular, the field of view from the own vehicle corresponds to a scope on the traffic lane which a driver of the own vehicle can see or the information acquiring apparatus such as a camera can detect.

With this aspect of the invention, the parking assist apparatus stops the own vehicle twice in the first situation. In particular, the parking assist apparatus stops the own vehicle at a position at which the field of view from the own vehicle is not interrupted by the first object and stops the own vehicle at a position at which the field of view from the own vehicle is not interrupted by the second object. Thus, the driver can surely confirm the situation of the traffic lane.

According to further another aspect of the invention, the electronic control unit may be configured to set the stopping number to one when the electronic control unit determines, based on the positional relationship, that a current situation is a second situation. In this case, the second situation may include (i) a situation that the first object and the second object interrupt a field of view from the own vehicle, and a distance in a longitudinal direction of the own vehicle between the first end portion and the second end portion is equal to or smaller than a predetermined threshold, and (i) a situation that only the first object interrupts the field of view from the own vehicle. Further, in this case, the electronic control unit may be configured to stop the own vehicle when the vehicle end portion reaches a position forward by a predetermined distance from the first end portion while the electronic control unit moves the own vehicle along the moving route.

With this aspect of the invention, the parking assist apparatus stops the own vehicle once at a position at which the driver can confirm the objects which approach the own vehicle from the right side and the left side of the own vehicle. Thus, even when the own vehicle is stopped only once, the driver can sufficiently confirm the situation of the traffic lane. Thus, the parking assist apparatus can prevent the driver from feeling bothersome and provide the driver with changes to confirm the situation of the traffic lane.

According to further another aspect of the invention, the electronic control unit may be configured to set the stopping number to zero when the electronic control unit determines, based on the positional relationship, that a current situation is a third situation. In this case, the third situation may include a situation that the first object and the second object do not interrupt a field of view from the own vehicle.

With this aspect of the invention, the parking assist apparatus does not stop the own vehicle in the third situation. Thus, the parking assist apparatus can prevent the driver from feeling bothersome.

According to further another aspect of the invention, the electronic control unit may be configured to calculate, as the positional relationship, (i) a first distance in a longitudinal direction of the own vehicle between the vehicle end portion and the first end portion, (ii) a second distance in the longitudinal direction of the own vehicle between the vehicle end portion and the second end portion, and (iii) a third distance in the longitudinal direction of the own vehicle between the first end portion and the second end portion.

According to one or more of embodiments, the electronic control unit may be realized by a micro-processor which is programmed so as to execute one or more functions described in the specification. Further, according to one or more of the embodiments, the electronic control unit may be entirely or partially realized by a hardware configured by an integrated circuit such as ASIC detected to one or more applications.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Below, one or more embodiments of the invention will be described with reference to the drawings. A parking assist apparatus is applied to an own vehicle SV (see FIG. 2).

Figure 1:
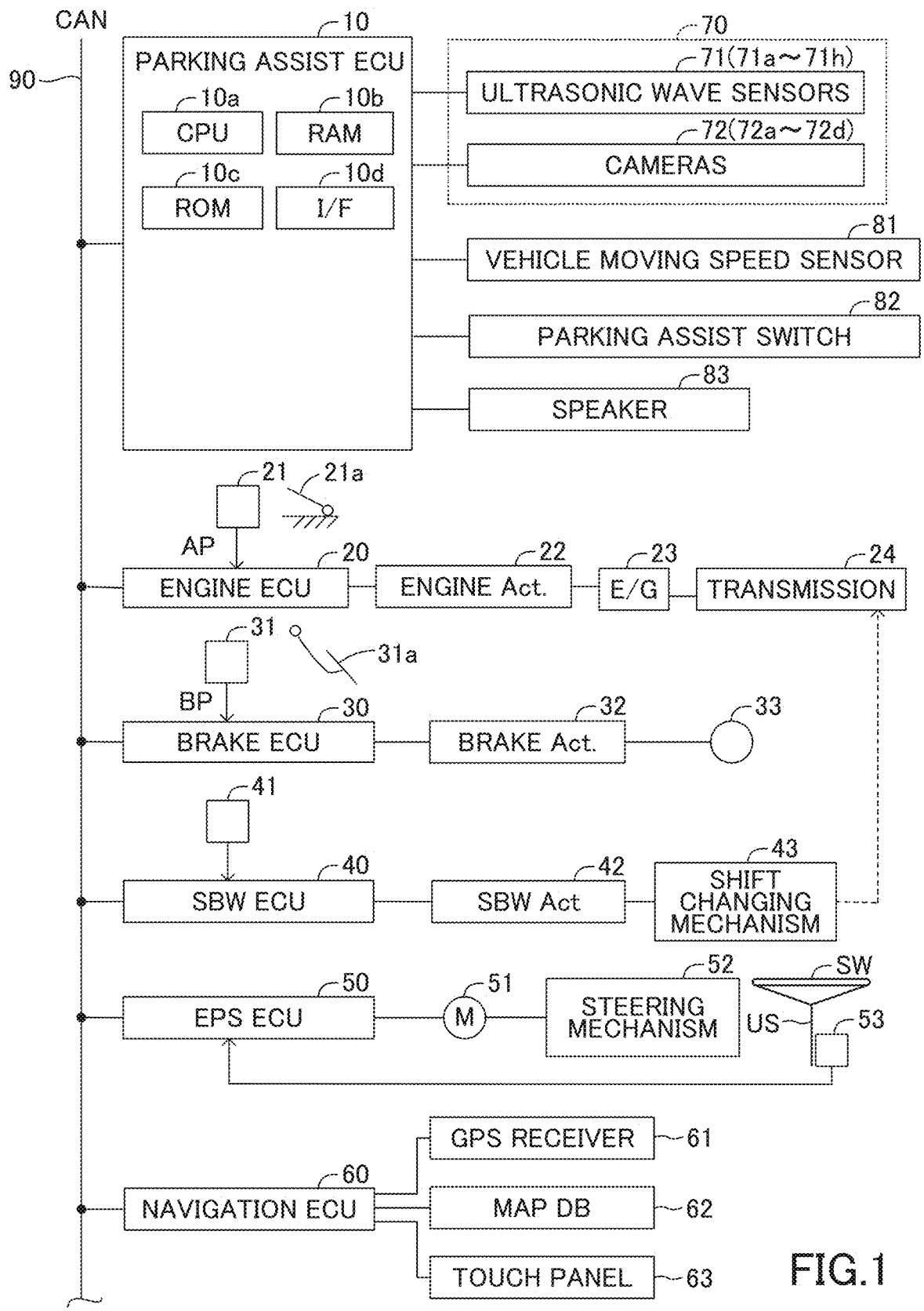
FIG. 1 is a general configuration view of a parking assist apparatus according to one or more embodiments of the invention.

As shown in FIG. 1, the parking assist apparatus includes a parking assist ECU 10. The parking assist ECU 10 includes a micro-computer which includes a CPU 10*a*, a RAM 10*b*, a ROM 10*c*, and an interface (I/F) 10*d*. In this specification, ECU stands for electronic control unit. The ECU includes a micro-computer which includes a CPU, a RAM, a ROM, and an interface. The CPU realizes various functions by executing instructions stored in the ROM.

The parking assist ECU 10 is electrically connected to an engine ECU 20, a brake ECU 30, an SBW (Shift-by-Wire) ECU 40, an electric power steering ECU (hereinafter, will be referred to as "EPS ECU") 50, and a navigation ECU 60 via a CAN (Controller Area Network) 90. The ECUs 10, 20, 30, 40, 50, and 60 are electrically connected so as to send and receive information to and from each other via the CAN 90. Thus, detection values of sensors electrically connected to one of the ECUs 10, 20, 30, 40, 50, and 60 can be sent to the remaining of the ECUs 10, 20, 30, 40, 50, and 60.

The engine ECU 20 is electrically connected to (i) engine state amount sensors (not shown) which include an accelerator pedal operation amount sensor 21 and (ii) engine actuators 22. The accelerator pedal operation amount sensor 21 detects an operation amount or an accelerator opening degree of an accelerator pedal 21*a* and generates a signal which represents an accelerator pedal operation amount AP.

The engine ECU 20 drives the engine actuators 22, based on the accelerator pedal operation amount AP and driving state amounts such as an engine speed detected by the engine state amount sensor other than the accelerator pedal operation amount sensor 21. Thereby, the engine ECU 20 can change an engine-generated torque which an internal combustion engine 23 generates. The engine-generated torque is transmitted to driven wheels of the own vehicle via a transmission 24. Thus, the engine ECU 20 can control driving force applied to the own vehicle SV by controlling the engine actuators 22.

When the own vehicle SV is a hybrid vehicle, the engine ECU 20 can control the driving force generated by one or both of the internal combustion engine and at least one electric motor as vehicle driving sources. When the own vehicle SV is an electric vehicle, the engine ECU 20 can control the driving force generated by at least one electric motor as the vehicle driving source.

The brake ECU 30 is electrically connected to (i) a brake pedal operation amount sensor 31 and (ii) brake actuators 32. The brake pedal operation amount sensor 31 detects an operation amount of a brake pedal 31*a* and outputs a signal which represents a brake pedal operation amount BP.

Braking force or braking torque applied to wheels of the own vehicle SV is controlled by the brake actuators 32. The brake actuators 32 adjust hydraulic pressure applied to wheel cylinders (not shown) of friction brake mechanisms 33 in response to commands from the brake ECU 30 and control braking pressure of the wheel cylinders by the hydraulic pressure. Thereby, the wheel cylinders generate friction braking force applied to the wheels of the own vehicle SV. Thus, the brake ECU 30 can control the braking force applied to the own vehicle SV by controlling the brake actuators 32.

The SBW ECU 40 is electrically connected to a shift lever sensor 41 and an SBW actuator 42. The shift lever sensor 41 detects a position of a shift lever. The SBW ECU 40 receives the position of the shift lever from the shift lever sensor 41 and controls the SBW actuator 42, based on the position of the shift lever. The SBW actuator 42 controls a shift changing mechanism in response to commands from the SBW ECU 40 to change a shift position of the transmission 24 to one of shift positions.

In this embodiment, the shift positions include (i) a parking position in which the driving force is not transmitted to the driven wheels, and the own vehicle SV is mechanically locked at a stopped position, (ii) a neutral position in which the driving force is not transmitted to the driven wheels, and the own vehicle SV is not mechanically locked at the stopped position, (iii) a forward moving position in which the driving force to drive the own vehicle SV forward is transmitted to the driven wheels, and (iv) a rearward moving position in which the driving force to drive the own vehicle SV rearward is transmitted to the driven wheels.

In particular, when a position of the shift lever is "P", the SBW ECU 40 drives the SBW actuator 42 to control the shift changing mechanism 43 to set the shift position of the transmission 24 to the parking position. When the position of the shift lever is "N", the SBW ECU 40 drives the SBW actuator 42 to control the shift changing mechanism 43 to set the shift position of the transmission 24 to the neutral position. When the position of the shift lever is "D", the SBW ECU 40 drives the SBW actuator 42 to control the shift changing mechanism 43 to set the shift position of the transmission 24 to the forward moving position. When the position of the shift lever is "R", the SBW ECU 40 drives the SBW actuator 42 to control the shift changing mechanism 43 to set the shift position of the transmission 24 to the rearward moving position.

The EPS ECU 50 is electrically connected to an assist motor (M) 51. The assist motor 51 is installed in a steering mechanism 52. The steering mechanism 52 is a mechanism which steers steered wheels of the own vehicle SV in response to a rotation operation applied to a steering wheel SW. The steering mechanism 52 includes the steering wheel SW, a steering shaft US connected to the steering wheel SW, and a steering gear mechanism (not shown). The EPS ECU 50 detects steering torque which the driver of the own vehicle inputs to the steering wheel SW by a steering torque sensor 53 provided on the steering shaft US and drives the assist motor 51, based on the steering torque. The EPS ECU 50 applies steering torque or steering assist torque to the steering mechanism 52 by driving the assist motor 51 and thereby assists the steering operation of the driver.

In addition, when the EPS ECU 50 receives steering commands from the parking assist ECU 10 via the CAN 90 while a parking assist control (described later) is being executed, the EPS ECU 50 drives the assist motor 51, based on the steering torque specified by the steering commands. This steering torque is different from the steering assist torque. This steering torque is torque applied to the steering mechanism 52 in response to the steering commands from the parking assist ECU 10 without the steering operation performed by the driver. This torque changes steered angles of the steered wheels (i.e., a steering angle) of the own vehicle SV.

The navigation ECU 60 includes a GPS receiver 61, a map database 62, and a touch panel 63. The GPS receiver 61 receives GPS signals used to detect a latitude and a longitude of a position of the own vehicle SV. The map database 62 stores map information. The navigation ECU 60 executes various calculation processes, based on (i) the latitude and the longitude of the position of the own vehicle SV and (ii) the map information. Then, the navigation ECU 60 displays the position of the own vehicle SV on a map on the touch panel 63. Hereinafter, a displaying mode of displaying the position of the own vehicle SV on the map on the touch panel 63 will be referred to as "first mode" or "navigation mode". The touch panel 63 is a touch panel type of a display which can display a map and images.

The displaying mode of the touch panel 63 includes a second mode or a parking assist mode in addition to the first mode. The second mode is the displaying mode which is used when the parking assist control is executed and displays various images which display surrounding situation around the own vehicle SV as described later. When an assistance request is generated as described later, the displaying mode is changed from the first mode to the second mode.

The parking assist ECU 10 is electrically connected to surrounding sensors 70. The surrounding sensors 70 acquire vehicle surrounding information. The vehicle surrounding information includes information on standing objects around the own vehicle SV and information on line markings or parking bay markings on road surface or ground surface around the own vehicle SV. The standing objects are, for example, moving objects such as vehicles, pedestrians, and bicycles, and fixed objects such as guard rails and fences. Hereinafter, the standing objects will be simply referred to as "objects". The surrounding sensors 70 include ultrasonic wave sensors 71*a* to 71*h* and cameras 72*a* to 72*d*. The ultrasonic wave sensors 71*a* to 71*h* will be collectively referred to as "ultrasonic wave sensors 71". The cameras 72*a* to 72*d* will be collectively referred to as "cameras 72". The surrounding sensors 70 will be also referred to as "information acquiring apparatus which acquires the vehicle surrounding information".

The ultrasonic wave sensors 71 transmit ultrasonic waves to a predetermined scope around the own vehicle SV in a pulsed manner and receive reflected waves which are reflected by the objects. The ultrasonic wave sensors 71 acquire information on (i) reflection points which are points on the object by which the transmitted ultrasonic waves are reflected and (ii) a distance between the ultrasonic wave sensor 71 and the reflection point, based on time taken from transmitting the ultrasonic wave to receive the reflected wave. The ultrasonic wave sensors 71 output the acquired information to the parking assist ECU 10.

Figure 2:
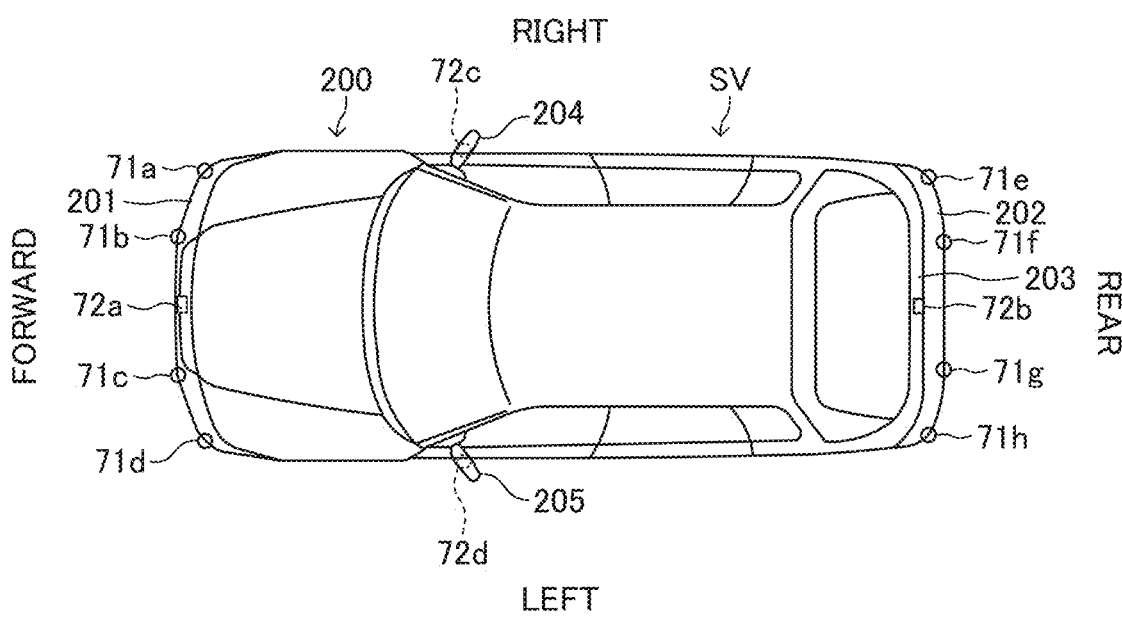
FIG. 2 is a plan view which shows ultrasonic wave sensors and cameras mounted on a vehicle.

As shown in FIG. 2, four ultrasonic wave sensors 71a to 71d are provided on a front bumper 201 of the own vehicle SV, spaced from each other in a width direction of the own vehicle SV. In addition, four ultrasonic wave sensors 71e to 71h are provided on a rear bumper 202 of the own vehicle SV, spaced from each other in the width direction of the own vehicle SV.

The cameras 72 are digital cameras which include imaging elements such as CCD (charge coupled device) or CIS (CMOS image sensor). The cameras 72 output image data on a surrounding area around the own vehicle SV with a predetermined frame rate. The cameras 72 take images of the surrounding situation (including positions and shapes of the objects, and positions and shapes of the line markings) around the own vehicle SV. Then, the cameras 72 output the image data to the parking assist ECU 10.

As shown in FIG. 2, the camera 72a is mounted on a generally center portion of the front bumper 201 in the width direction of the own vehicle SV. The camera 72a takes images of a forward area ahead of the own vehicle SV. The camera 72b is mounted on a wall portion of a rear trunk 203 or a rear boot of a rear portion of a vehicle body 200. The camera 72b takes images of a rear area behind the own vehicle SV. The camera 72c is mounted on a right door mirror 204. The camera 72c takes images of a right area rightward from the own vehicle SV. The camera 72d is mounted on a left door mirror 205. The camera 72d takes images of a left area leftward from the own vehicle SV. Below, the image data acquired by the cameras 72a, 72b, 72c, and 72d will be also referred to as "forward image data", "rear image data", "right image data" and "left image data", respectively.

The parking assist ECU 10 receives the information from the ultrasonic wave sensors 71 each time a predetermined time (for the convenience, this predetermined time will be also referred to as "first time") elapses. The parking assist ECU 10 plots the information (i.e., positions of the reflection points at which the ultrasonic waves are reflected) on a two-dimension map. The two-dimension map is a plan view which includes (i) an origin which corresponds to the position of the own vehicle SV, (ii) an X axis which corresponds to a moving direction of the own vehicle SV, and (iii) a Y axis which corresponds to a leftward direction of the own vehicle SV. The position of the own vehicle SV is a predetermined geometric center position on a planar view of the own vehicle SV. The parking assist ECU 10 detects the objects around the own vehicle SV, based on shapes defined by a group of the reflection points on the two-dimension map. Then, the parking assist ECU 10 determines positions (distances and orientations) and shapes of the objects with respect to the own vehicle SV.

The position of the own vehicle SV may be another particular position on the own vehicle SV, for example, a center position between a left front wheel and a right front wheel of the own vehicle SV or a center position between a left rear wheel and a right rear wheel of the own vehicle SV.

In addition, the parking assist ECU 10 acquires the image data from the cameras 72 each time the first time elapses. The parking assist ECU 10 detects the objects around the own vehicle SV by analyzing the image data from the cameras 72. Then, the parking assist ECU 10 determines the positions (the distances and the orientations) and the shapes of the objects with respect to the own vehicle SV. The parking assist ECU 10 draws, on the two-dimension map, the objects determined or detected, based on the image data. Thus, the parking assist ECU 10 can detect the objects around the own vehicle SV in a predetermined distance area from the position of the own vehicle SV, based on the information on the two-dimension map.

The parking assist ECU 10 detects an area where no objects exist around the own vehicle SV, based on the information on the two-dimension map. When the area where no objects exist has a size and a shape to which the own vehicle SV is allowed to move, the parking assist ECU 10 determines the area where no objects exist as a pulling-out-permitted area or a parking-permitted area.

Further, the parking assist ECU 10 is electrically connected to a vehicle moving speed sensor 81, a parking assist switch 82, and a speaker 83.

The vehicle moving speed sensor 81 detects a moving speed of the own vehicle SV and outputs a signal which represents the moving speed.

The parking assist switch 82 is a switch which is pressed by the driver when the driver requests the parking assist ECU 10 to execute the parking assist control, i.e., when the driver generates the assistance request described later.

The speaker 83 generates voice when the speaker 83 receives an announcement command from the parking assist ECU 10.

<Displaying Screen Images>

Figure 3:
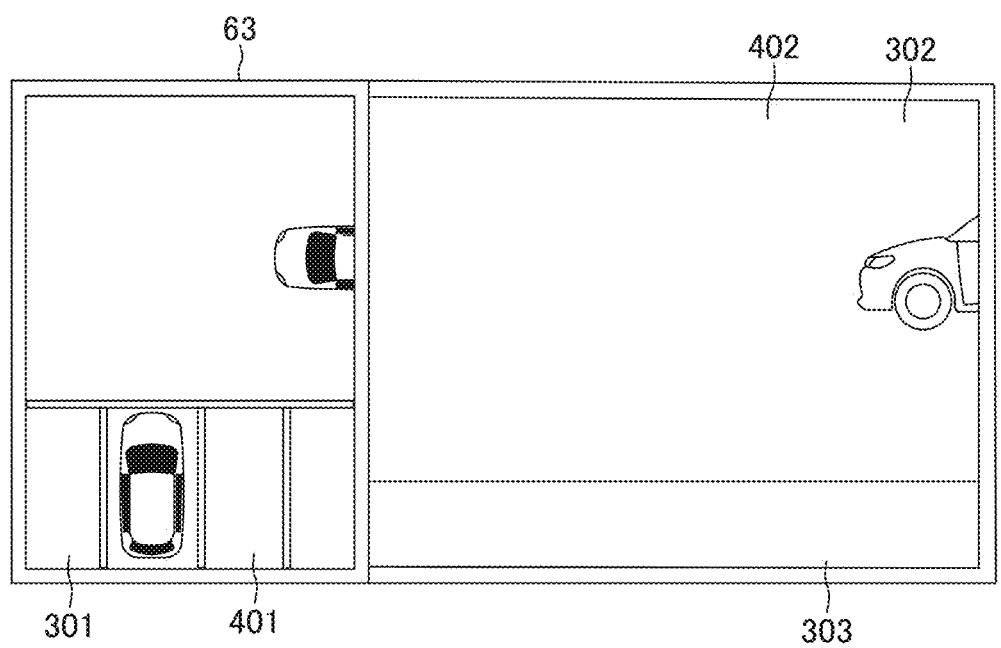
FIG. 3 is a view which shows a screen image (an assist mode screen image) displayed when a displaying mode of a touch panel is a second mode.

Next, screens images (hereinafter, will be referred to as "assist mode screen images") which are displayed on the touch panel 63 when the displaying mode is the second mode, will be described. As shown in FIG. 3, the assist mode screen image has a first displaying area 301, a second displaying area 302, and a third displaying area 303.

When the displaying mode is the second mode, the parking assist ECU 10 displays a point-of-view image and a moving direction image (described later) in the assist mode screen image. Below, methods of producing the point-of-view image and the moving direction image will be briefly described.

The parking assist ECU 10 produces the point-of-view image, based on the image data (i.e., the forward image data, the rear image data, the right image data, and the left image data) acquired by the cameras 72. The point-of-view image corresponds to an image of the own vehicle SV and an area surrounding the own vehicle SV from a set virtual point of view. The method of producing the point-of-view image is known (for example, see JP 2012-217000 A and JP 2013-021468 A). For example, the point-of-view image is an image taken by viewing the own vehicle SV from directly above. The point-of-view image is also referred to as "perspective image".

The parking assist ECU 10 produces the moving direction image, based on the forward image data and the rear image data. The moving direction image is an image which displays an area in the moving direction of the own vehicle SV. When the parking assist ECU 10 moves the own vehicle SV forward, the parking assist ECU 10 produces the moving direction image which displays a forward area ahead of the own vehicle SV, based on the forward image data. On the other hand, when the parking assist ECU 10 moves the own vehicle SV rearward, the parking assist ECU 10 produces the moving direction image which displays a rear area behind the own vehicle SV, based on the rear image data.

As shown in FIG. 3, the parking assist ECU 10 displays a perspective image 401 in the first displaying area 301 and displays a moving direction image 402 in the second displaying area 302.

<Processes of Parking Assist Control>

The parking assist ECU 10 monitors the position of the shift lever and an operation applied to the parking assist switch 82 and selects an assist mode from a pulling-out mode, a double-parking mode, and a parallel-parking mode.

The pulling-out mode is a mode which carries out an assistance to move or pull out the parked own vehicle SV to a traffic lane. The double-parking mode is a mode which carries out an assistance to double park the own vehicle SV. The double-parking is a parking of parking the own vehicle SV perpendicular to the traveling direction of the traffic lane. The parallel-parking mode is a mode which carries out the assistance to parallel park the own vehicle SV. The parallel-parking is a parking of parking the own vehicle SV parallel to the traveling direction of the traffic lane. The double-parking mode and the parallel-parking mode do not directly relate to features of this embodiment. Thus, descriptions of the double-parking mode and the parallel-parking mode will be omitted.

For example, when the position of the shift lever is "P", and the parking assist switch 82 is pressed once, the parking assist ECU 10 selects the pulling-out mode as the assist mode.

When the parking assist ECU 10 selects the pulling-out mode, the parking assist ECU 10 sets a target area in the pulling-out-permitted area. The target area is an area which the vehicle body 200 occupies when the own vehicle SV has been pulled out. Further, the parking assist ECU 10 sets, as a target position, the position of the own vehicle which is moved to the target area. The target position is a position where the center position of the own vehicle SV in the planar view is to reach. In this specification and the claims, moving the center position of the own vehicle SV to the target position or a predetermined position will be also referred to as "moving the own vehicle SV to the target position or the predetermined position".

Then, the parking assist ECU 10 calculates a moving route for moving the own vehicle SV from its current position to the target position. The moving route is a route which can maintain the own vehicle SV spaced by a predetermined interval distance with respect to the objects such as other vehicles, curbstone, and guard rails while the center position of the own vehicle SV is moved from its current position to the target position. The moving route may be calculated by one of various known techniques (for example, a technique disclosed in JP 2015-3565 A).

Once the parking assist ECU 10 determines the moving route, the parking assist ECU 10 determines moving assist information used to move the own vehicle SV along the moving route. The moving assist information includes a moving direction of the own vehicle SV (in particular, the shift position of the transmission 24), a steering angle pattern (steering angle information), and a moving speed pattern (moving speed information).

The parking assist ECU 10 sends shift control commands to the SBW ECU 40 via the CAN 90, depending on the determined shift position. When the SBW ECU 40 receives the shift control commands from the parking assist ECU 10, the SBW ECU 40 drives the SBW actuator 42 to change the shift position of the transmission 24 to a position commanded by the shift control commands. That is, the SBW ECU 40 executes a shift control.

The steering angle pattern is data on the steering angles associated with the center position of the own vehicle SV on the moving route. The steering angle pattern represents change of the steering angle or a target steering angle while the center position of the own vehicle SV is moved along the moving route. The parking assist ECU 10 sends steering commands (including the target steering angle) to the EPS ECU 50 via the CAN 90 in accordance with the determined steering angle pattern. When the EPS ECU 50 receives the steering commands from the parking assist ECU 10, the EPS ECU 50 drives the assist motor 51, based on the steering torque commanded by the steering commands to control the actual steering angle to the target steering angle. That is, the EPS ECU 50 executes a steering angle control.

The moving speed pattern is data on the moving speed associated with the center position of the own vehicle SV on the moving route. The moving speed pattern represents change of the moving speed or a target value of the moving speed while the center position of the own vehicle SV is moved along the moving route. The parking assist ECU 10 sends driving force control commands to the engine ECU 20 via the CAN 90 in accordance with the determined moving speed pattern. When the engine ECU 20 receives the driving force control commands from the parking assist ECU 10, the engine ECU 20 controls the engine actuators 22 in response to the driving force control commands. That is, the engine ECU 20 executes a driving force control. Further, the parking assist ECU 10 sends braking force control commands to the brake ECU 30 via the CAN 90 in accordance with the determined moving speed pattern. When the brake ECU 30 receives the braking force control commands from the parking assist ECU 10, the brake ECU 30 controls the brake actuators 32 in response to the braking force control commands. That is, the brake ECU 30 executes a braking force control.

<Assistance Requests>

As described below, the parking assist ECU 10 monitors the operation applied to the parking assist switch 82, the shift position, and the surrounding situation around the own vehicle SV and determines whether a pulling-out assistance request is generated. Hereinafter, the pulling-out assistance request will be simply referred to as "assistance request".

When conditions A1 to A4 below are all satisfied, the parking assist ECU 10 determines that the assistance request is generated.

Condition A1: The assistance request has not been generated.

Condition A2: The pulling-out mode is selected. That is, the shift position is the parking position "P", and the parking assist switch 82 is pressed once.

Condition A3: The vehicle moving speed at a point of time when the condition A2 becomes satisfied, is a predetermined stop determination vehicle moving speed (for example, zero [km/h]).

Condition 4: An area (i.e., the pulling-out-permitted area) on the traffic lane next to an area where the own vehicle SV has been parked and which has a size and a shape which permit the own vehicle SV to exist, is detected.

When the assistance request is generated, the parking assist ECU 10 executes the parking assist control in the pulling-out mode.

<Summary of Operations>

In this embodiment, the parking assist ECU 10 changes the stopping number of stopping the own vehicle SV, depending on the surrounding situation around the own vehicle SV while the parking assist ECU 10 moves the own vehicle SV along the moving route. Below, a flow of specific processes will be described.

Figure 4:
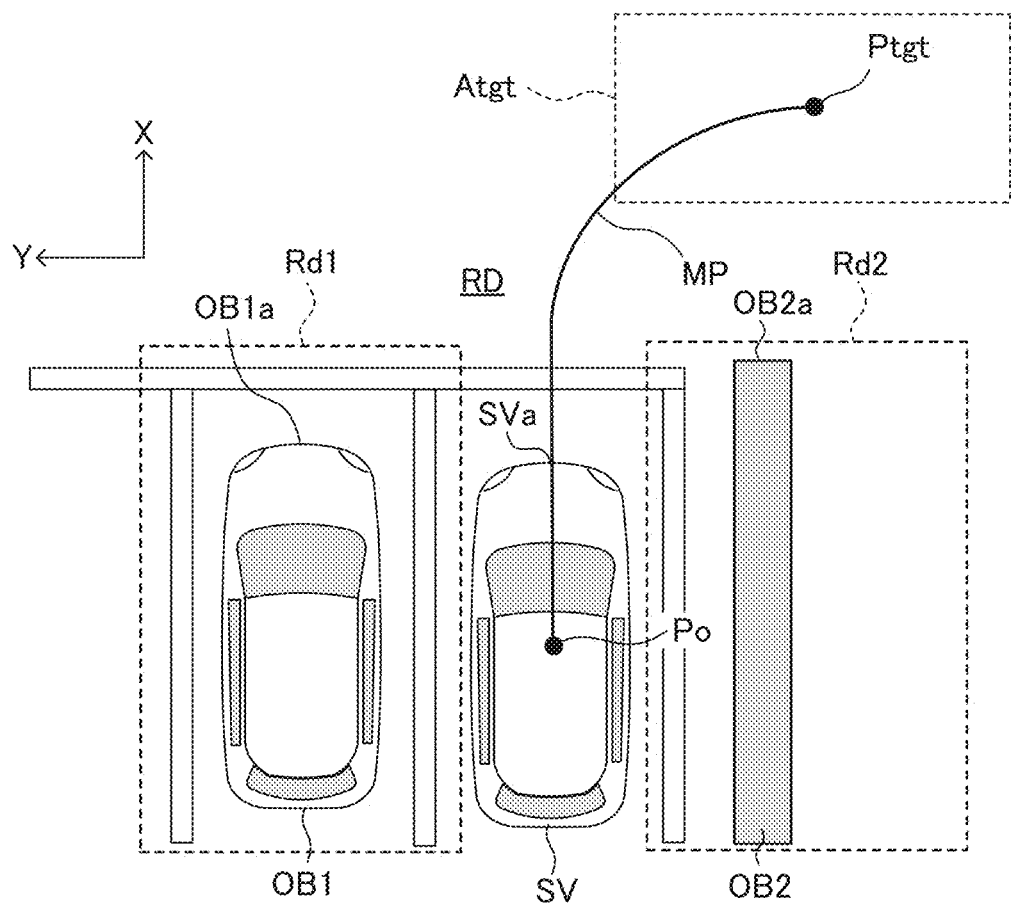
FIG. 4 is a view which shows an example of a first situation.

In an example shown in FIG. 4, the own vehicle SV has been parked and thus the vehicle moving speed of the own vehicle SV is zero, and the shift position is the parking position "P". There is a vehicle OB1 to the left side of the own vehicle SV. Further, there is another vehicle OB2 to the right side of the own vehicle SV.

The driver of the own vehicle SV presses the parking assist switch 82 once to move the own vehicle SV to the traffic lane RD. The parking assist ECU 10 detects the pulling-out-permitted area on the traffic lane RD. Since the conditions A1 to A4 are satisfied, the parking assist ECU 10 determines that the assistance request is generated.

The parking assist ECU 10 sets the target area Atgt in the pulling-out-permitted area. Then, the parking assist ECU 10 sets, as the target position Ptgt, the position of the own vehicle SV which is moved to the target area Atgt. Then, the parking assist ECU 10 calculates the moving route MP to move the own vehicle SV from its current position Po to the target position Ptgt.

Then, the parking assist ECU 10 determines whether there are the objects in a predetermined first area Rd1 to the left side of the own vehicle SV on the two-dimension map. A length of the predetermined first area Rd1 along the X axis and a length of the predetermined first area Rd1 along the Y axis are sets such that the predetermined first area Rd1 can accommodate a vehicle having an ordinary size. In this example, the parking assist ECU 10 detects the vehicle OB1 in the predetermined first area Rd1. Hereinafter, the detected object (other vehicle) OB1 in the predetermined first area Rd1 will be referred to as "first object OB1".

Further, the parking assist ECU 10 determines whether there are the objects in a predetermined second area Rd2 to the right side of the own vehicle SV on the two-dimension map. A Length of the predetermined second area Rd2 along the X axis and a length of the predetermined second area Rd2 along the Y axis are sets similar to the predetermined first area Rd1. In this example, the parking assist ECU 10 detects a wall OB2 in the predetermined second area Rd2. Hereinafter, the detected object (wall) OB2 in the predetermined second area Rd2 will be referred to as "second object OB2".

Hereinafter, an end portion SVa of the own vehicle SV at the side of the traffic lane RD will be referred to as "vehicle end portion SVa". Further, an end portion OB1a of the first object OB1 at the side of the traffic lane RD will be referred to as "first end portion OB1a". Furthermore, an end portion OB2a of the second object OB2 at the side of the traffic lane RD will be referred to as "second end portion OB2a".

Then, the parking assist ECU 10 calculates information on a positional relationship between the vehicle end portion SVa, the first end portion OB1a, and the second end portion OB2a. The parking assist ECU 10 changes or sets the stopping number, based on the calculated positional relationship.

Figure 5:
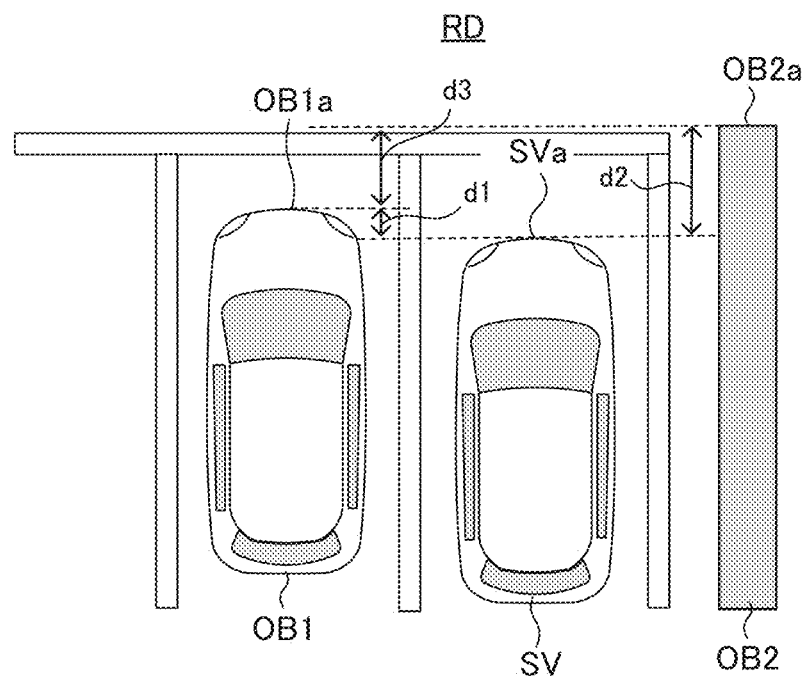
FIG. 5 is a view which shows the example of the first situation.

In particular, as shown in FIG. 5, the parking assist ECU 10 calculates a first distance d1, a second distance d2, and a third distance d3 as the information on the positional relationship.

The first distance d1 is a distance between the vehicle end portion SVa and the first end portion OB1a in a longitudinal direction of the own vehicle SV. As shown in FIG. 5, when the first end portion OB1a is located at the side of the traffic lane RD with respect to the vehicle end portion SVa, the first distance d1 calculated by the parking assist ECU 10 is a negative value. On the other hand, when the vehicle end portion SVa is located at the side of the traffic lane RD with respect to the first end portion OB1a, the first distance d1 calculated by the parking assist ECU 10 is a positive value.

The second distance d2 is a distance between the vehicle end portion SVa and the second end portion OB2a in the longitudinal direction of the own vehicle SV. As shown in FIG. 5, when the second end portion OB2a is located at the side of the traffic lane RD with respect to the vehicle end portion SVa, the second distance d2 calculated by the parking assist ECU 10 is a negative value. On the other hand, when the vehicle end portion SVa is located at the side of the traffic lane RD with respect to the second end portion OB2a, the second distance d2 calculated by the parking assist ECU 10 is a positive value.

The third distance d3 is a distance ($\geq 0$) between the first end portion OB1a and the second end portion OB2a in the longitudinal direction of the own vehicle SV.

Then, the parking assist ECU 10 determines whether the current situation (i.e., the situation at a point of time when an execution of the parking assist control is started) is a first situation or a second situation or a third situation. Hereinafter, this process will be also referred to as "situation determination process". The first situation, the second situation, and the third situation will be described later in detail.

When the parking assist ECU 10 determines that the current situation is the first situation, the parking assist ECU 10 sets the stopping number to two. When the parking assist ECU 10 determines that the current situation is the second situation, the parking assist ECU 10 sets the stopping number to one. When the parking assist ECU 10 determines that the current situation is the third situation, the parking assist ECU 10 sets the stopping number to zero. That is, the parking assist ECU 10 does not stop the own vehicle SV.

Below, conditions of determining the first situation, the second situation, and the third situation will be described in detail.

<First Situation>

Figure 6:
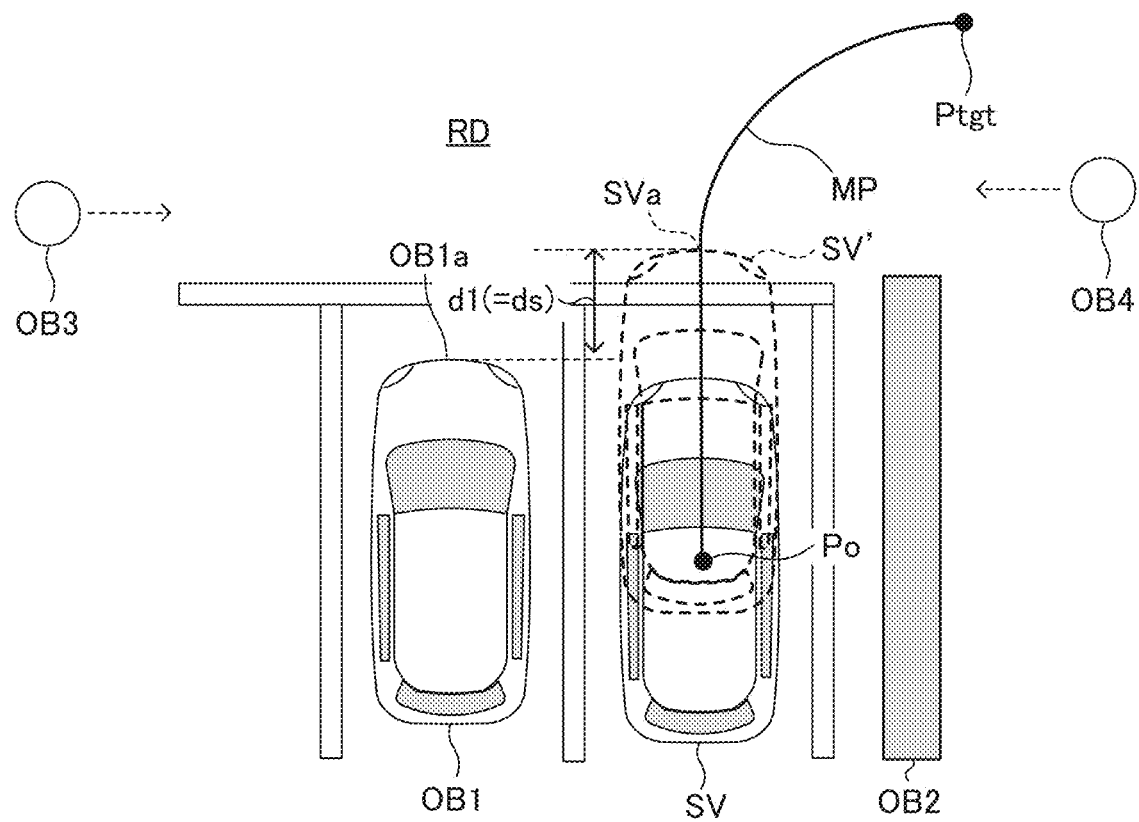
FIG. 6 is a view which shows the example of the first situation.

As shown in FIG. 6, when the own vehicle SV is at a position Po (the current position Po), the first object OB1 interrupts a field of view from the own vehicle SV. The field of view from the own vehicle SV is a scope on the traffic lane RD which can be confirmed from the own vehicle SV. In this example, the field of view from the own vehicle SV is a scope on the traffic lane RD which the driver can see. As described later, the field of view from the own vehicle SV may be a scope on the traffic lane RD which the cameras 72 can take images.

When the field of view of the driver is interrupted by the first object OB1, the driver cannot confirm or see an object (a pedestrian) OB3 which moves on the traffic lane RD and approaches the own vehicle SV from the left side of the own vehicle SV. Hereinafter, the object OB3 will be referred to as "third object OB3".

In addition, the second object OB2 interrupts the field of view of the driver. Thus, the driver cannot confirm or see an object (a pedestrian) OB4 which moves on the traffic lane RD and approaches the own vehicle SV from the right side of the own vehicle SV. Hereinafter, the object OB4 will be referred to as "fourth object OB4".

As shown in FIG. 6, the own vehicle SV is moved along the moving route MP, and the first distance d1 becomes equal to a predetermined positive distance ds (see a chain line SV'). The predetermined positive distance ds is set to a value that the field of view of the driver is not interrupted by the first object OB1. In this case, the driver can confirm the third object OB3.

In this example, there is a large difference between a position of the first end portion OB1a in the longitudinal direction of the own vehicle SV and a position of the second end portion OB2a in the longitudinal direction of the own vehicle SV. That is, the third distance d3 is long. Thus, when the own vehicle SV is stopped at a point of time when the first distance d1 becomes equal to the predetermined positive distance ds, the second object OB2 still interrupts the field of view of the driver (i.e., the right field of view of the driver). Thus, at this time, it is difficult for the driver to confirm the fourth object OB4.

Figure 7:
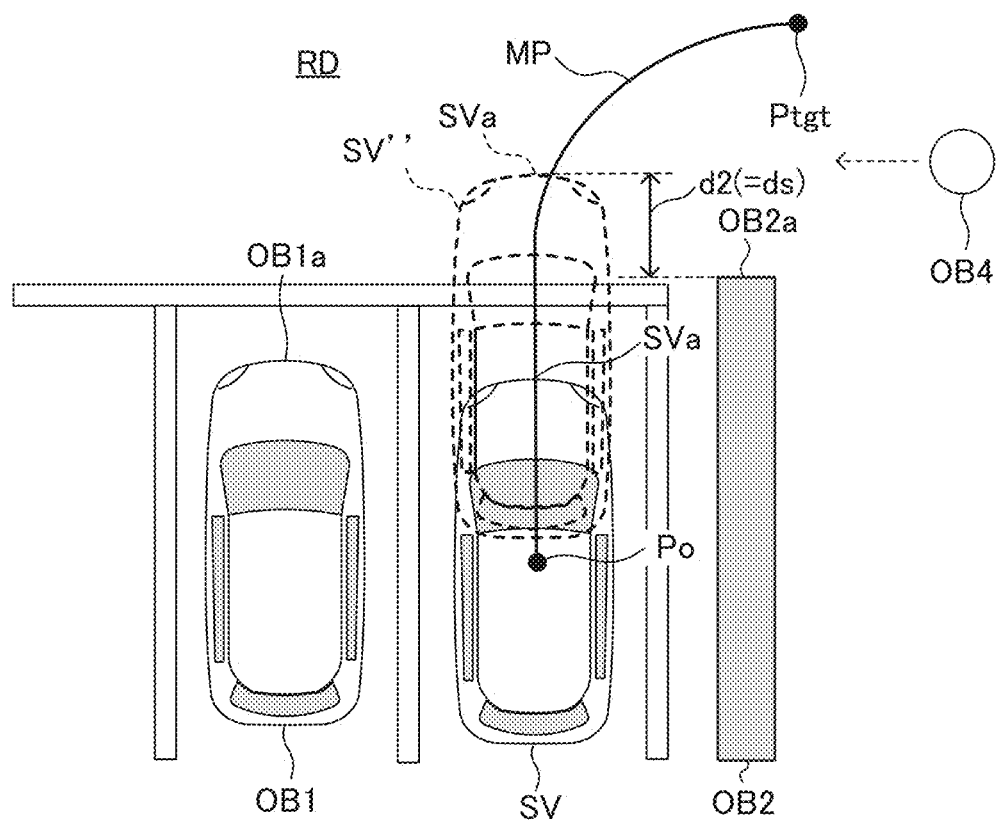
FIG. 7 is a view which shows the example of the first situation.

As shown in FIG. 7, the own vehicle SV is further moved along the moving route MP, and the second distance d2 becomes equal to the predetermined positive distance ds (see a chain line SV"). In this case, the driver can confirm the fourth object OB4. As described above, in the example shown in FIG. 5, the driver can confirm the situation of the traffic lane RD with the own vehicle SV being stopped twice.

In consideration of the above, when conditions B1 to B3 are all satisfied, the parking assist ECU 10 determines that the current situation is the first condition.

Condition B1: The parking assist ECU 10 detects the first object OB1 in the predetermined first area Rd1 and detects the second object OB2 in the predetermined second area Rd2.

Condition B2: The first distance d1 is shorter than a predetermined first threshold dth1, and the second distance d2 is shorter than the predetermined first threshold dth1. The condition B2 is a condition used to determine whether the first object OB1 and the second object OB2 both interrupt the field of view from the own vehicle SV (the field of view of the driver). The predetermined first threshold dth1 is set, for example, to a value equal to or smaller than zero. The predetermined first threshold dth1 may be changed, depending on types of vehicles. For example, when a length between a driver's seat and the vehicle end portion SVa is long, the predetermined first threshold dth1 may be set to a positive value.

Condition B3: The third distance d3 is longer than a predetermined positive second threshold dth2.

As understood from the above, the first situation includes a situation that the first object OB1 and the second object OB2 both interrupt the field of view of the driver, and the third distance d3 is longer than the predetermined positive second threshold dth2.

Figure 8:
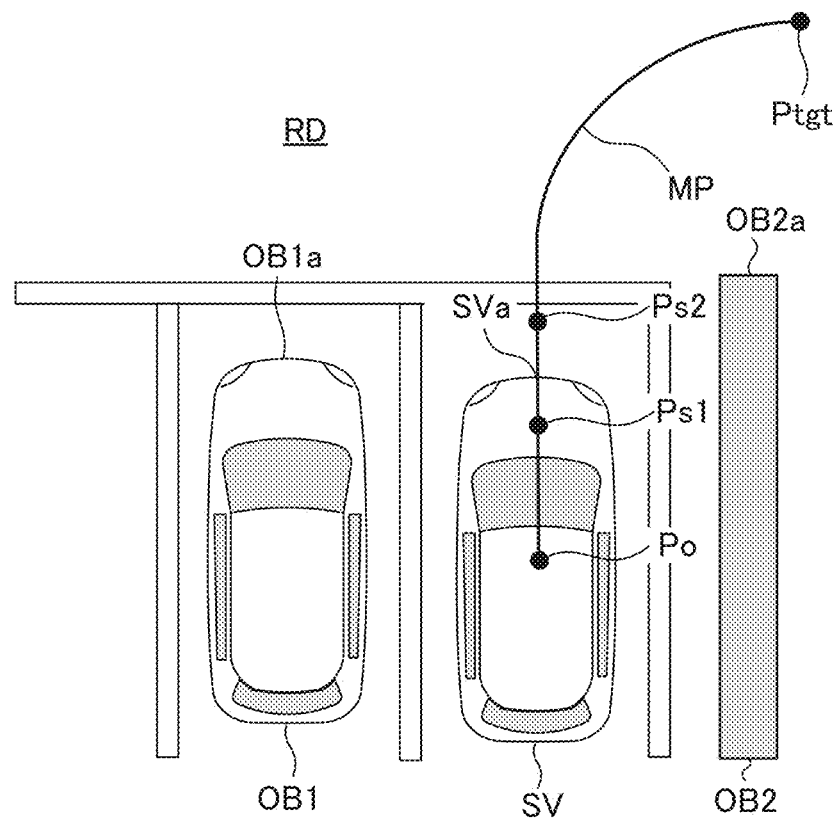
FIG. 8 is a view which shows the example of the first situation.

When the parking assist ECU 10 determines that the current situation is the first situation, as shown in FIG. 8, the parking assist ECU 10 sets a first stopping position Ps1 and a second stopping position Ps2 on the moving route MP. The first stopping position Ps1 is a position at which the first distance d1 becomes equal to the predetermined positive distance ds (see FIG. 6). The second stopping position Ps2 is a position at which the second distance d2 becomes equal to the predetermined positive distance ds (see FIG. 7). Then, the parking assist ECU 10 calculates the moving speed pattern which stops the own vehicle SV at the first stopping position Ps1 and stops the own vehicle SV at the second stopping position Ps2.

<Second Situation>

Figure 9:
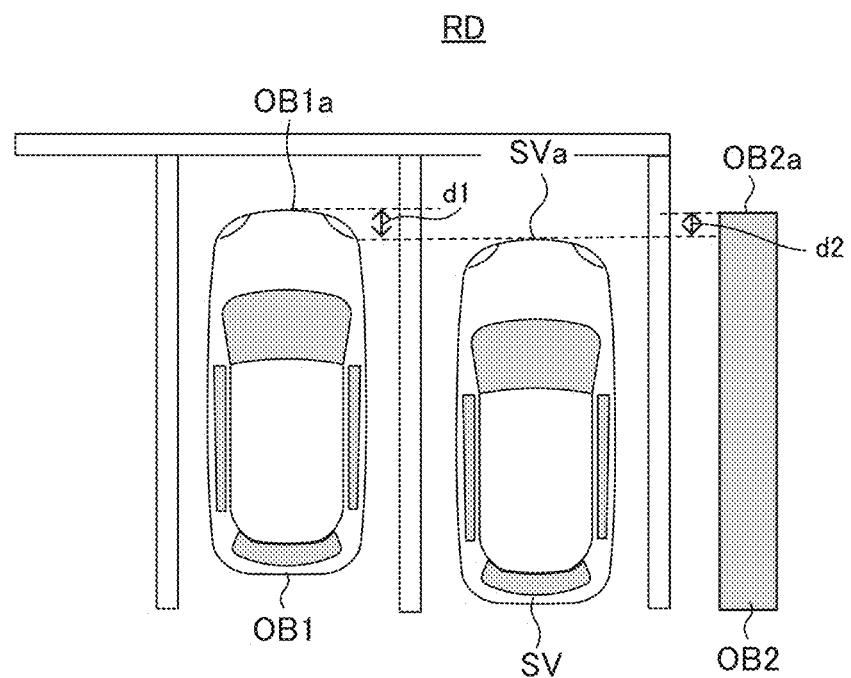
FIG. 9 is a view which shows an example of a second situation.

FIG. 9 shows an example of the second situation. Also, in this example, there is the first object OB1 to the left side of the own vehicle SV, and there is the second object OB2 to the right side of the own vehicle SV. However, a distance between the first end portion OB1a and the traffic lane RD is slightly shorter than a distance between the second end portion OB2a and the traffic lane RD.

Figure 10:
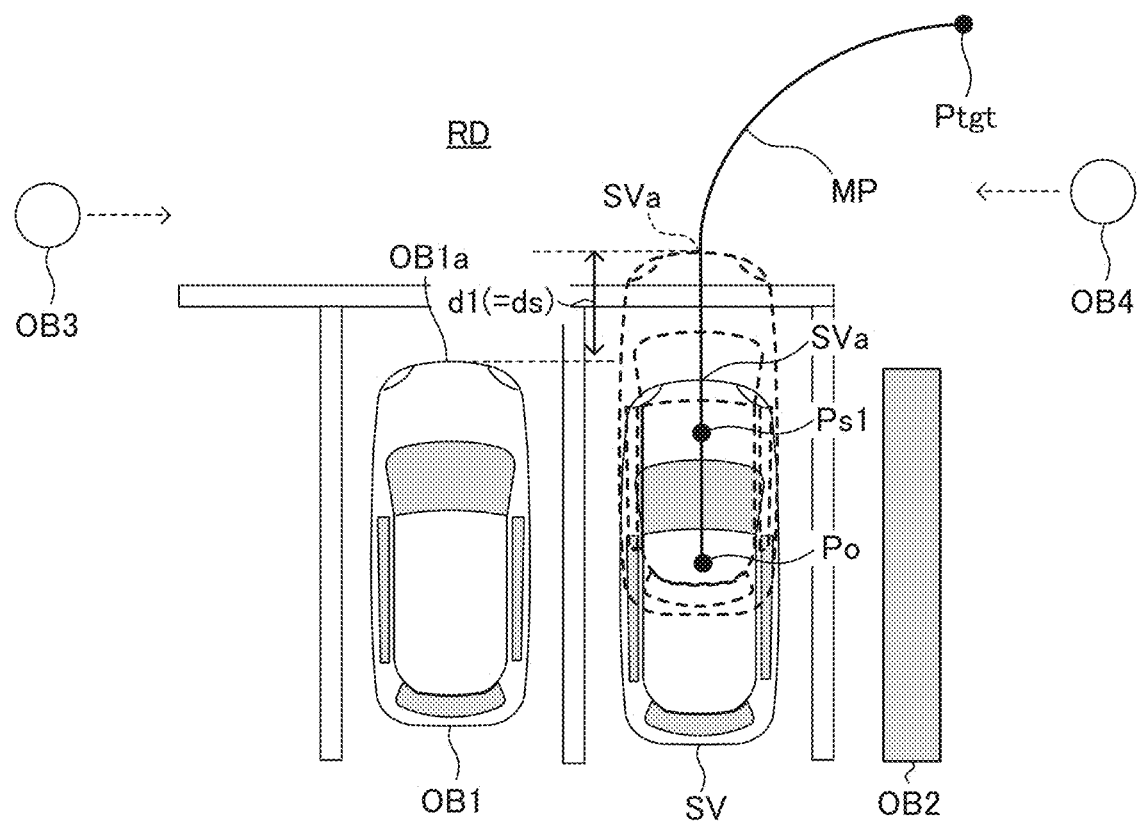
FIG. 10 is a view which shows the example of the second situation.

As shown, there is a small difference between the position of the first end portion OB1a in the longitudinal direction of the own vehicle SV and the position of the second end portion OB2a in the longitudinal direction of the own vehicle SV. That is, the third distance d3 (not shown) is equal to or shorter than the predetermined positive second threshold dth2. In this situation, as shown in FIG. 10, the own vehicle SV is moved along the moving route MP, and the first distance d1 becomes equal to the predetermined positive distance ds. At this time, the field of view of the driver is not interrupted by the first object OB1 and the second object OB2. Thus, the driver can confirm the third object OB3 and the fourth object OB4. As described above, in an example shown in FIG. 9, when the own vehicle SV is stopped once, the driver can confirm the situation of the traffic lane RD.

In consideration of the above, when conditions C1 to C3 are all satisfied, the parking assist ECU 10 determines that the current situation is the second situation.

Condition C1: The parking assist ECU 10 detects the first object OB1 in the predetermined first area Rd1 and detects the second object OB2 in the predetermined second area Rd2.

Condition C2: The first distance d1 is shorter than the predetermined first threshold dth1, and the second distance d2 is shorter than the predetermined first threshold dth1.

Condition C3: The third distance d3 is equal to or shorter than the predetermined positive second threshold dth2.

When the parking assist ECU 10 determines that the current situation is the second situation, the parking assist ECU 10 selects, as a target object, the object which has a shorter distance to the traffic lane RD, from the first object OB1 and the second object OB2. In this example, the target object is the first object OB1. Then, the parking assist ECU 10 sets the first stopping position Ps1 on the moving route MP. As shown in FIG. 10, the first stopping position Ps1 is a position at which the first distance d1 between an end portion of the target object (i.e., the first end portion OB1a) and the vehicle end portion SVa becomes equal to the predetermined positive distance ds. Then, the parking assist ECU 10 calculates the moving speed pattern which stops the own vehicle SV at the first stopping position Ps1.

Figure 11:
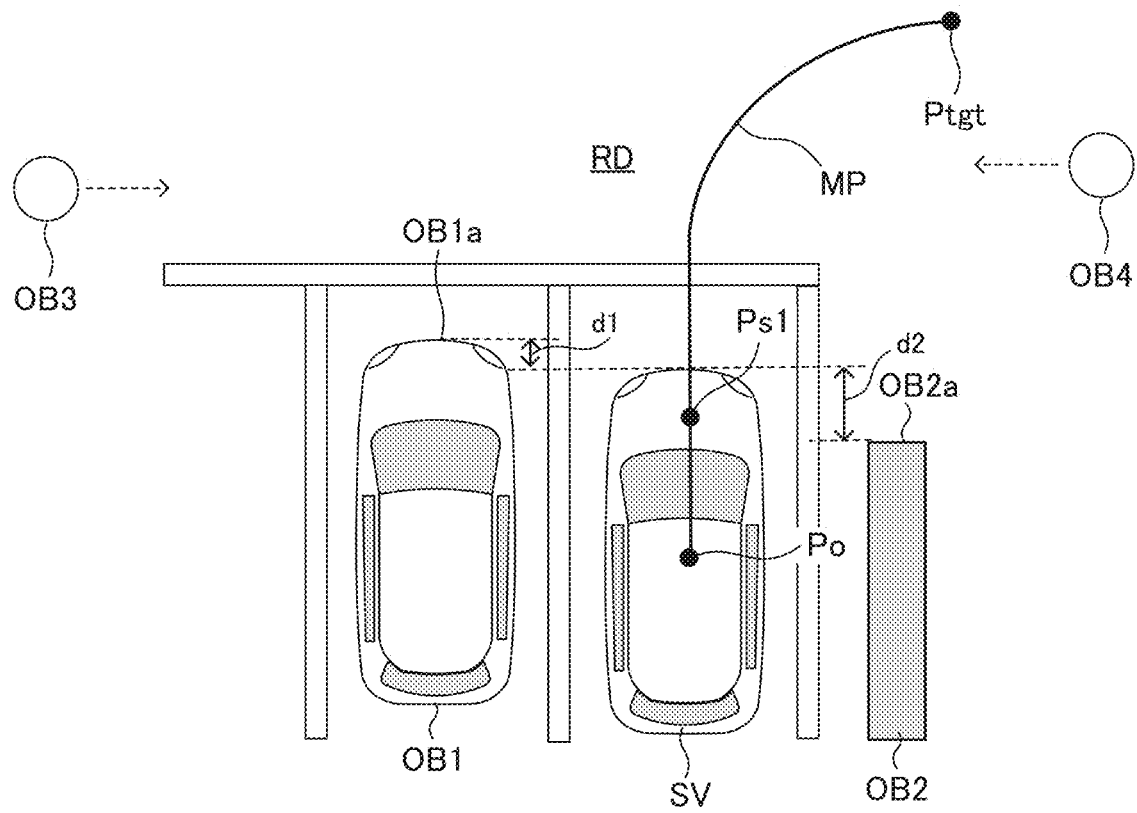
FIG. 11 is a view which shows another example of the second situation.

In another example shown in FIG. 11, when the own vehicle SV is at a position Po (the current position Po), the second object OB2 does not interrupt the field of view of the driver. Thus, the driver can confirm the fourth object OB4. Only the first object OB1 interrupts the field of view of the driver. Also, in this situation, the driver can confirm the situation of the traffic lane RD with the own vehicle SV being stopped once.

In consideration of the above, when conditions D1 and D2 are both satisfied, the parking assist ECU 10 determines that the current situation is the second situation.

Condition D1: The parking assist ECU 10 detects the first object OB1 in the predetermined first area Rd1 and detects the second object OB2 in the predetermined second area Rd2.

Condition D2: One of the first distance d1 and the second distance d2 is shorter than the predetermined first threshold dth1, and the remaining of the first distance d1 and the second distance d2 is equal to or longer than the predetermined first threshold dth1. The condition D2 is a condition used to determine whether only one of the first object OB1 and the second object OB2 interrupts the field of view of the driver.

Then, the parking assist ECU 10 sets the first stopping position Ps1 on the moving route MP similar to the above.

The first stopping position Ps1 is a position at which the first distance d1 becomes equal to the predetermined positive distance ds. Then, the parking assist ECU 10 calculates the moving speed pattern which stops the own vehicle SV at the first stopping position Ps1.

Figure 12:
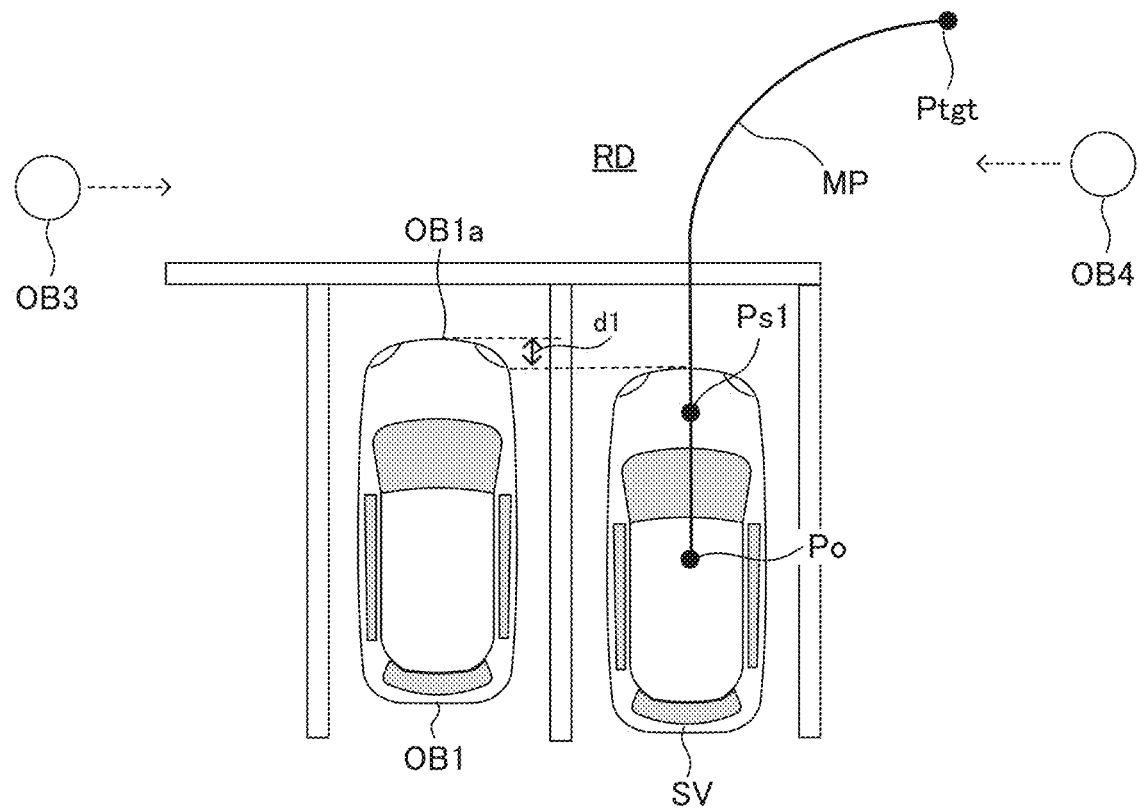
FIG. 12 is a view which shows further another example of the second situation.

In further another example shown in FIG. 12, there is only the first object OB1, and the first object OB1 interrupts the field of view of the driver. Also, in this situation, the driver can confirm the situation of the traffic lane RD with the own vehicle SV being stopped once.

In consideration of the above, when conditions E1 and E2 are both satisfied, the parking assist ECU 10 determines that the current situation is the second situation. Then, the parking assist ECU 10 sets the first stopping position Ps1 on the moving route MP. The first stopping position Ps1 is a position at which the first distance d1 becomes equal to the predetermined positive distance ds.

Condition E1: The parking assist ECU 10 detects the first object OB1 in the predetermined first area Rd1 but does not detect any objects in the predetermined second area Rd2.

Condition E2: The first distance d1 is shorter than the predetermined first threshold dth1.

Further, when conditions F1 and F2 are both satisfied, the parking assist ECU 10 determines that the current situation is the second situation. Then, the parking assist ECU 10 sets the second stopping position Ps2 on the moving route MP. The second stopping position Ps2 is a position at which the second distance d2 becomes equal to the predetermined positive distance ds.

Condition F1: The parking assist ECU 10 does not detect any objects in the predetermined first area Rd1 but detects the second object OB2 in the predetermined second area Rd2.

Condition F2: The second distance d2 is shorter than the predetermined first threshold dth1.

As understood from the above, the second situation includes (i) a situation that the first object OB1 and the second object OB2 both interrupt the field of view of the driver, and the third distance d3 is equal to or shorter than the predetermined positive second threshold dth2 and (ii) only one of the first object OB1 and the second object OB2 interrupts the field of view of the driver.

<Third Situation>

When the current situation is not the first situation nor the second situation, the parking assist ECU 10 determines that the current situation is the third situation.

Figure 13:
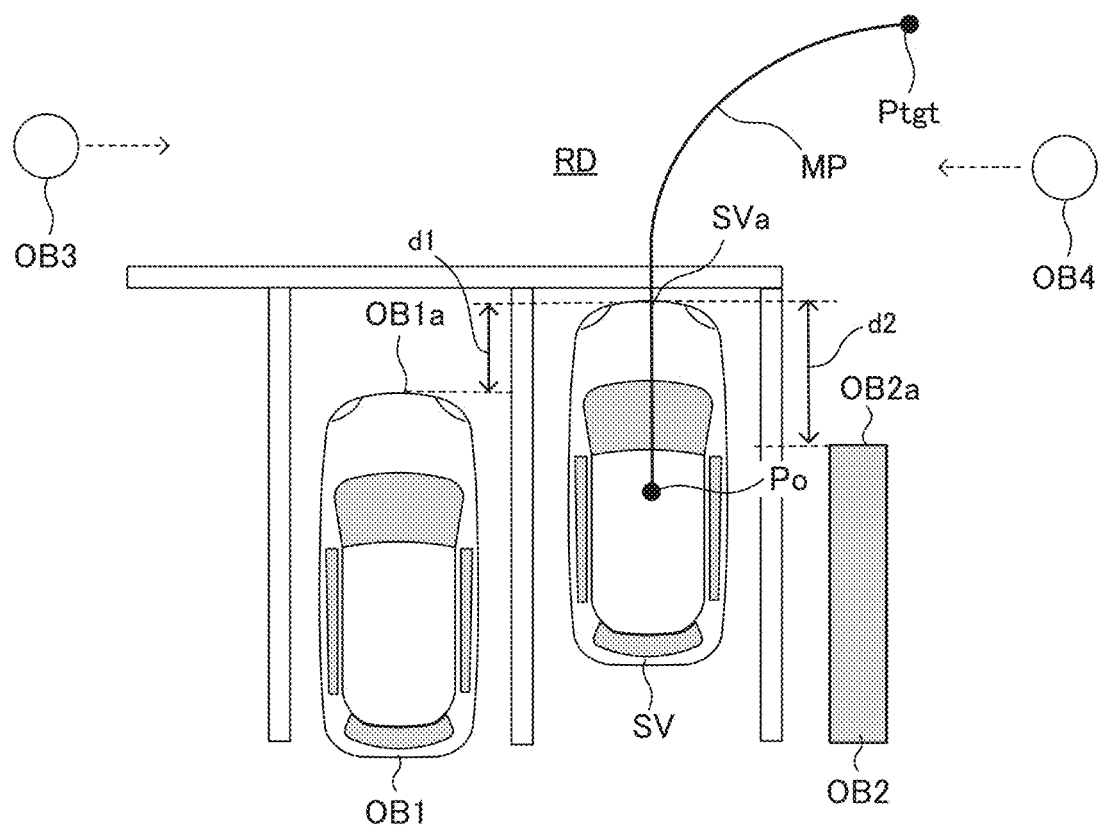
FIG. 13 is a view which shows an example of a third situation.

FIG. 13 shows an example of the third situation. In this example, there are the first object OB1 and the second object OB2. However, the first distance d1 and the second distance d2 are both relatively large positive values. The first object OB1 and the second object OB2 do not interrupt the field of view of the driver. Thus, the driver can confirm the third object OB3 and the fourth object OB4. In this situation, it is not necessary to provide the driver with chances to confirm the situation of the traffic lane RD. As understood from the above, the third situation includes a situation that the first object OB1 and the second object OB2 do not interrupt the field of view of the driver.

In the situation shown in FIG. 13, the parking assist ECU 10 determines that the current situation is the third situation. Then, the parking assist ECU 10 calculates the moving speed pattern which does not stop the own vehicle SV.

Figure 14:
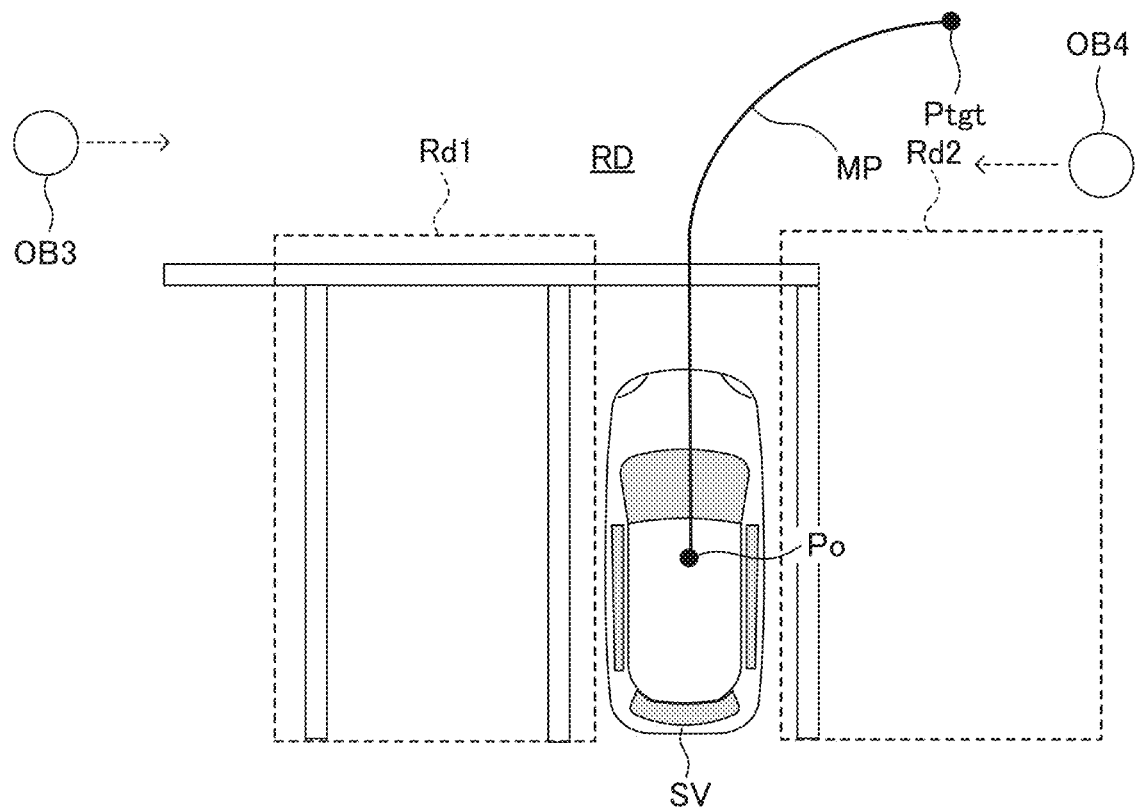
FIG. 14 is a view which shows another example of the third situation.

FIG. 14 shows another example of the third situation. In this example, there are no objects in the predetermined first area Rd1 and the predetermined second area Rd2. Thus, the driver can confirm the third object OB3 and the fourth object OB4. Also, in the situation shown in FIG. 14, the parking assist ECU 10 determines that the current situation is the third situation. Then, the parking assist ECU 10 calculates the moving speed pattern which does not stop the own vehicle SV.

<Autonomous Stopping Process>

When the parking assist ECU 10 stops the own vehicle SV at the first stopping position Ps1 or the second stopping position Ps2, the parking assist ECU 10 suspends or temporarily stops the execution of the parking assist control. After the parking assist ECU 10 suspends the execution of the parking assist control, the parking assist ECU 10 executes an autonomous stopping process of maintaining the own vehicle SV stopped. The parking assist ECU 10 sends the braking force control command to the brake ECU 30 to generate the braking force to maintain the own vehicle SV stopped.

<Resuming Operations>

After the parking assist ECU 10 suspends the execution of the parking assist control and starts an execution of autonomous stopping process, the parking assist ECU 10 requests the driver to carry out a predetermined resuming operation. The resuming operation is an operation for resuming the execution of the parking assist control. In this embodiment, the resuming operation is an operation applied to the brake pedal 31a.

Figure 15:
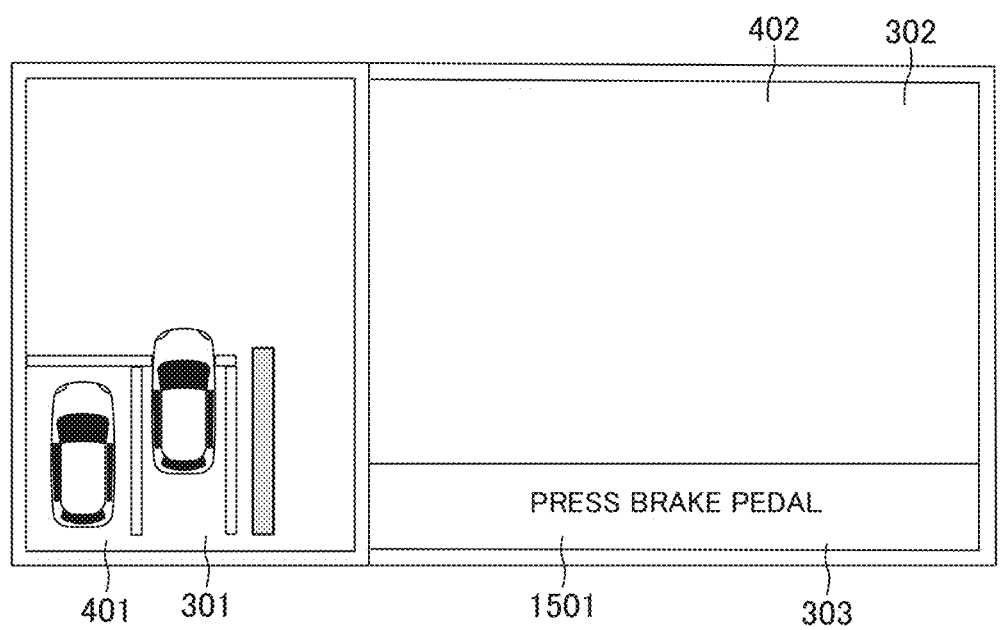
FIG. 15 is a view which shows a message displayed in the assist mode screen image.

In particular, as shown in FIG. 15, the parking assist ECU 10 displays, in the third displaying area 303 of the assist mode screen image, a message 1501 which requests the driver to press the brake pedal 31a. In addition, the parking assist ECU 10 outputs the message 1501 from the speaker 83.

Figure 16:
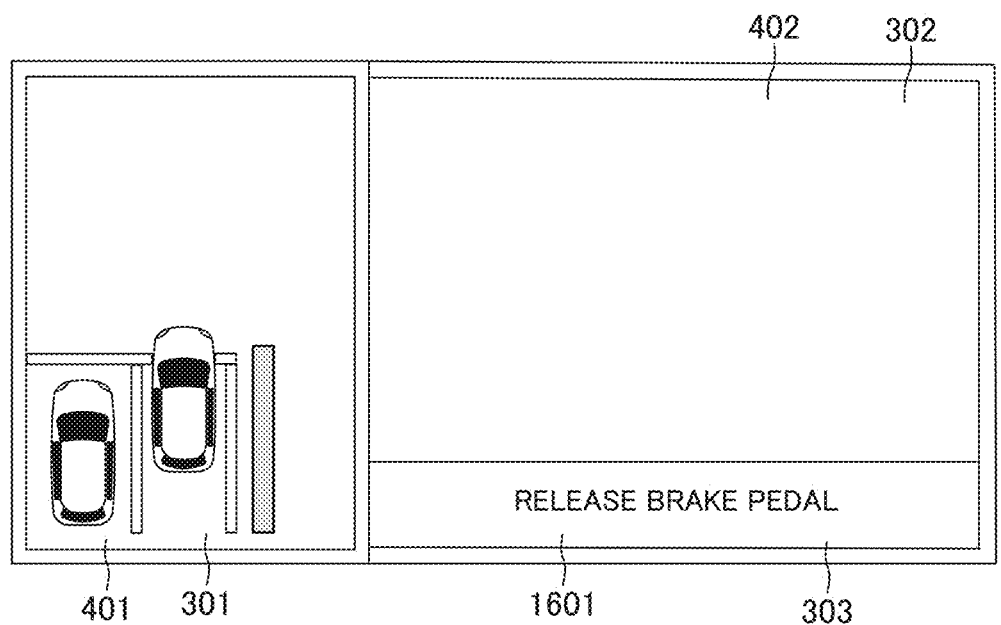
FIG. 16 is a view which shows a message displayed in the assist mode screen image.

Then, the parking assist ECU 10 determines whether the brake pedal 31a is pressed, based on the brake pedal operation amount BP. When the brake pedal 31a is pressed, the parking assist ECU 10 requests the driver to release the brake pedal 31a. In particular, as shown in FIG. 16, the parking assist ECU 10 displays, in the third displaying area 303 of the assist mode screen image, a message 1601 which requests the driver to release the brake pedal 31a. In addition, the parking assist ECU 10 outputs the message 1601 from the speaker 83.

Then, the parking assist ECU 10 determines whether the brake pedal 31a is released, based on the brake pedal operation amount BP. When the brake pedal 31a is released, the parking assist ECU 10 stops the execution of the autonomous stopping process and resumes the execution of the parking assist control.

<Pulling-Out Assist Operations>

Next, a flow of the parking assist control in the pulling-out mode (hereinafter, will be also referred to as "pulling-out assistance") will be described. The CPU 10a (hereinafter, will be simply referred to as "CPU") of the parking assist ECU 10 is configured or programmed to execute routines shown in FIGS. 17 to 20, respectively each time a predetermined time (i.e., the first time) elapses.

In addition, the CPU is configured or programmed to execute routines not shown each time the first time elapses to acquire the vehicle surrounding information from the surrounding sensors 70 and update the two-dimension map, based on the vehicle surrounding information.

In addition, when a position of an ignition key switch or a start switch (not shown) of the own vehicle SV is changed from an OFF position to an ON position, the CPU executes an initializing routine (not shown) to set values of various flags (X1 and X2) described below to zero, respectively.

Figure 17:
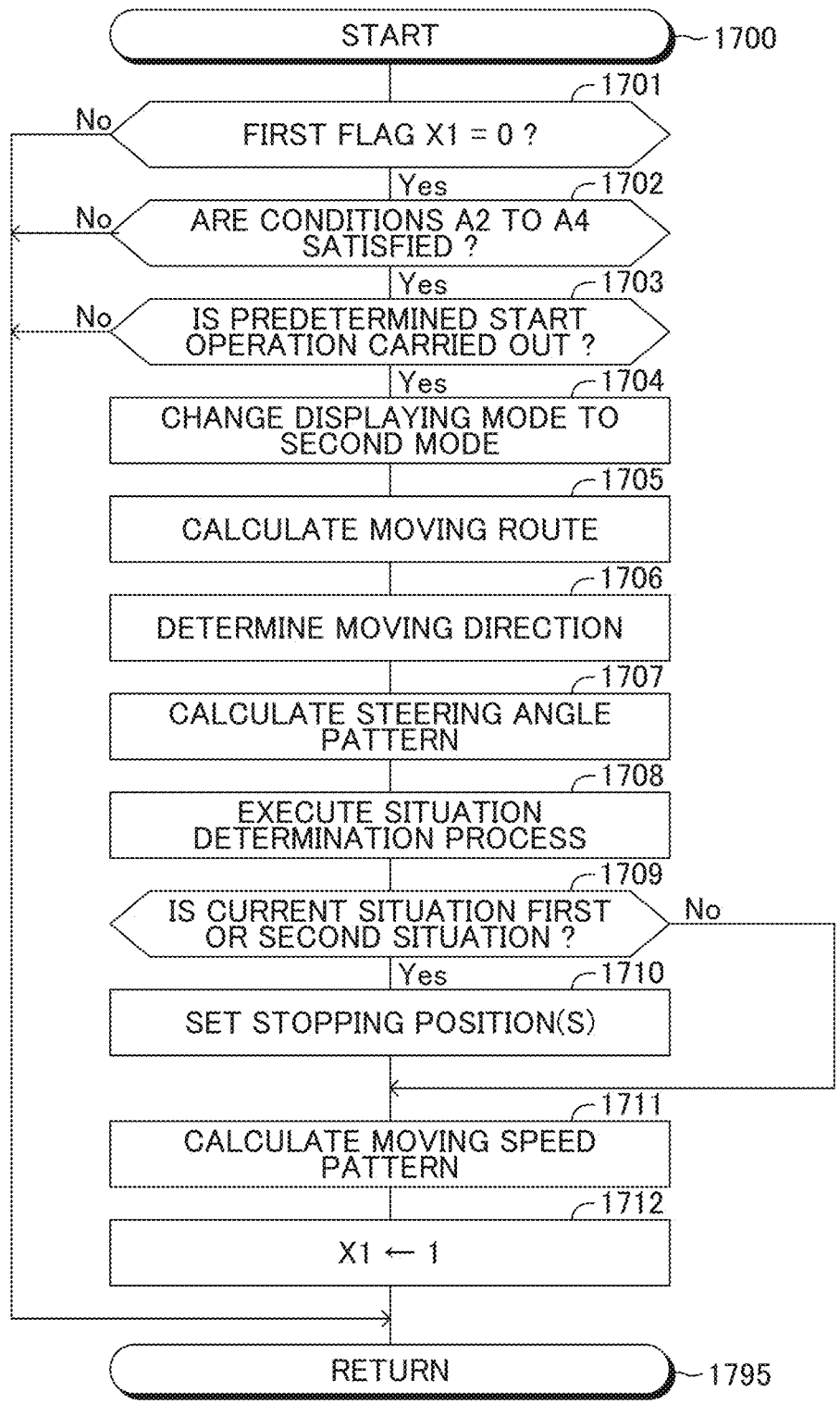
FIG. 17 is a view which shows a flowchart of a pulling-out assist start routine executed by a CPU of a parking assist ECU.

At a predetermined timing, the CPU starts a process from a step 1700 of the routine shown in FIG. 17 and proceeds with the process to a step 1701 to determine whether a value of a first flag X1 is "0". When the value of the first flag X1 is "0", the first flag X1 represents that the assistance request (i.e., the pulling-out assistance request) is not generated. On the other hand, when the value of the first flag X1 is "1", the first flag X1 represents that the assistance request is generated. In other words, the CPU determines at the step 1701 whether the condition A1 is satisfied. When the value of the first flag X1 is not "0", the CPU determines "No" at the step 1701 and proceeds with the process directly to a step 1795 to terminate executing this routine once.

On the other hand, when the value of the first flag X1 is "0", the CPU determines "Yes" at the step 1701 and proceeds with the process to a step 1702 to determine whether the conditions A2 to A4 are satisfied. When at least one of the conditions A2 to A4 is not satisfied, the CPU determines "No" at the step 1702 and proceeds with the process directly to the step 1795 to terminate executing this routine once.

On the other hand, when the conditions A2 to A4 are satisfied, the CPU determines "Yes" at the step 1702 and proceeds with the process to a step 1703 to determine whether a predetermined start operation is carried out. The CPU displays, on the touch panel 63, a first button used to select the moving direction of the own vehicle SV (i.e., a rightward direction or a leftward direction) and a second button used to start the pulling-out assistance. The predetermined start operation includes operations applied to the first button and the second button. When the predetermined start operation is not carried out, the CPU determines "No" at the step 1703 and proceeds with the process directly to the step 1795 to terminate executing this routine once.

On the other hand, when the predetermined start operation is carried out, the CPU determines "Yes" at the step 1703 and sequentially executes processes of steps 1704 to 1708 described below. Then, the CPU proceeds with the process to a step 1709.

Step 1704: The CPU changes the displaying mode of the screen image displayed on the touch panel 63 from the first mode to the second mode. Thereby, the assist mode screen image is displayed on the touch panel 63.

Step 1705: The CPU sets the target area Atgt in the pulling-out-permitted area. Then, the CPU sets, as the target position Ptgt, the center position of the own vehicle SV which is moved to the target area Atgt. Then, the CPU calculates the moving route MP along which the CPU moves the position of the own vehicle SV from its current position Po (a start position) to the target position Ptgt.

Step 1706: The CPU determines the moving direction of the own vehicle SV (in particular, the shift position).

Step 1707: The CPU calculates the steering angle pattern which moves the own vehicle SV along the moving route MP.

Step 1708: The CPU executes the situation determination process as described above. The CPU determines which of the first situation, the second situation, and the third situation the current situation is, based on the vehicle surrounding information (in particular, the two-dimension map).

When the CPU proceeds with the process to the step 1709, the CPU determines whether the current situation determined at the step 1708 is the first situation or the second situation. When the current situation is the first situation or the second situation, the CPU determines "Yes" at the step 1709 and sequentially executes processes of steps 1710 to 1712 described below. Then, the CPU proceeds with the process to the step 1795 to terminate executing this routine once.

Step 1710: The CPU sets one or two stopping positions on the moving route MP, depending on the situation determined at the step 1708. When the current situation is the first situation, the CPU sets the first stopping position Ps1 and the second stopping position Ps2 on the moving route MP as described above. When the current situation is the second situation, the CPU sets the first stopping position Ps1 on the moving route MP as described above.

Step 1711: The CPU calculates the moving speed pattern as described above.

Step 1712: The CPU sets the value of the first flag X1 to "1".

Figure 18:
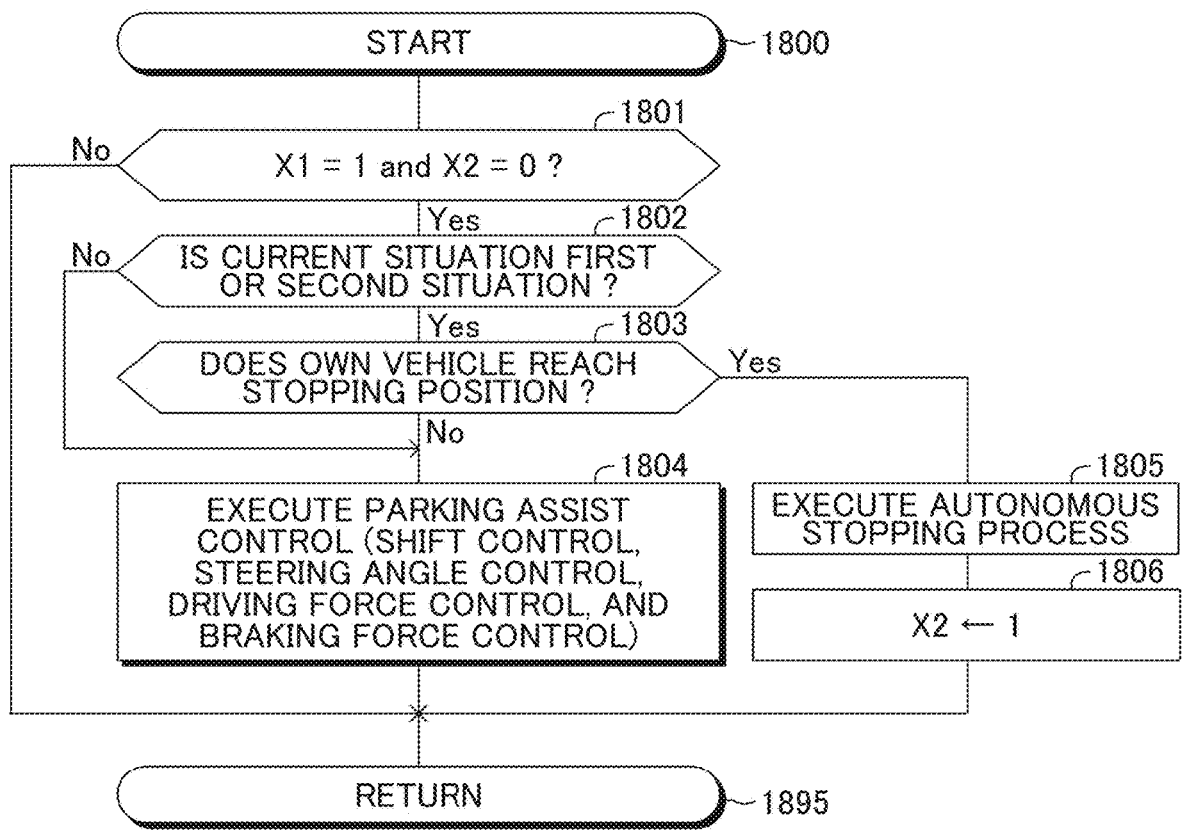
FIG. 18 is a view which shows a flowchart of a parking assist control execution routine executed by the CPU.

Further, at a predetermined timing, the CPU starts a process from a step 1800 of the routine shown in FIG. 18 and proceeds with the process to a step 1801 to determine whether the value of the first flag X1 is "1", and a value of a second flag X2 is "0". When the value of the second flag X2 is "0", the second flag X2 represents that the execution of the parking assist control is not suspended or not temporarily stopped. On the other hand, when the value of the second flag X2 is "1", the second flag X2 represents that the execution of the parking assist control is suspended. When the value of the first flag X1 is "0", or the value of the second flag X2 is "1", the CPU determines "No" at the step 1801 and proceeds with the process directly to a step 1895 to terminate executing this routine once.

On the other hand, when the value of the first flag X1 is "1", and the value of the second flag X2 is "0", the CPU determines "Yes" at the step 1801 and proceeds with the process to a step 1802 to determine whether the situation determined at the step 1708 of the routine shown in FIG. 17 is the first situation or the second situation. When the situation determined at the step 1708 is the third situation, the CPU determines "No" at the step 1802 and proceeds with the process directly to a step 1804 to execute the parking assist control. In particular, the CPU sends the shift control commands to the SBW ECU 40 in accordance with the determined shift position to execute the shift control. Further, the CPU sends the steering commands including the target steering angle to the EPS ECU 50 in accordance with the determined steering angle pattern to execute the steering angle control. Furthermore, the CPU sends the driving force control commands to the engine ECU 20 in accordance with the moving speed pattern to execute the driving force control. Furthermore, the CPU sends the braking force control commands to the brake ECU 30 in accordance with the moving speed pattern to execute the braking force control. Thereby, the driver can move the center position of the own vehicle SV to the target position Ptgt on the traffic lane RD without carrying out driving operations to the shift lever, the steering wheel SW, the accelerator pedal 21*a*, and the brake pedal 31*a*. Then, the CPU proceeds with the process to the step 1895 to terminate executing this routine once.

It should be noted that when the driver requests the large braking force by operating the brake pedal 31*a*, the CPU may control the brake actuators 32 to generate the braking force, depending on the driver's request. In this case, the CPU may set the driving force to zero by controlling the engine actuators 22.

On the other hand, when the situation determined at the step 1708 is the first situation or the second situation, the CPU determines "Yes" at the step 1802 and proceeds with the process to a step 1803 to determine whether the own vehicle SV reaches the stopping position (the first stopping position Ps1 or the second stopping position Ps2). When the own vehicle SV does not reach the stopping position, the CPU determines "No" at the step 1803 and proceeds with the process to the step 1804 to execute the parking assist control.

When the CPU repeatedly executes the routine shown in FIG. 18, that is the CPU repeatedly executes the process of the step 1804 and the own vehicle SV reaches the stopping position, the CPU proceeds with the process to the step 1803 and determines "Yes" at the step 1803 and sequentially executes processes of steps 1805 and 1806 described below. Then, the CPU proceeds with the process to the step 1895 to terminate executing this routine once.

Step 1805: The CPU executes the autonomous stopping process as described above.

Step 1806: The CPU sets the value of the second flag X2 to "1". Thereby, the CPU determines "No" at the step 1801 and thus the execution of the parking assist control is suspended.

Figure 19:
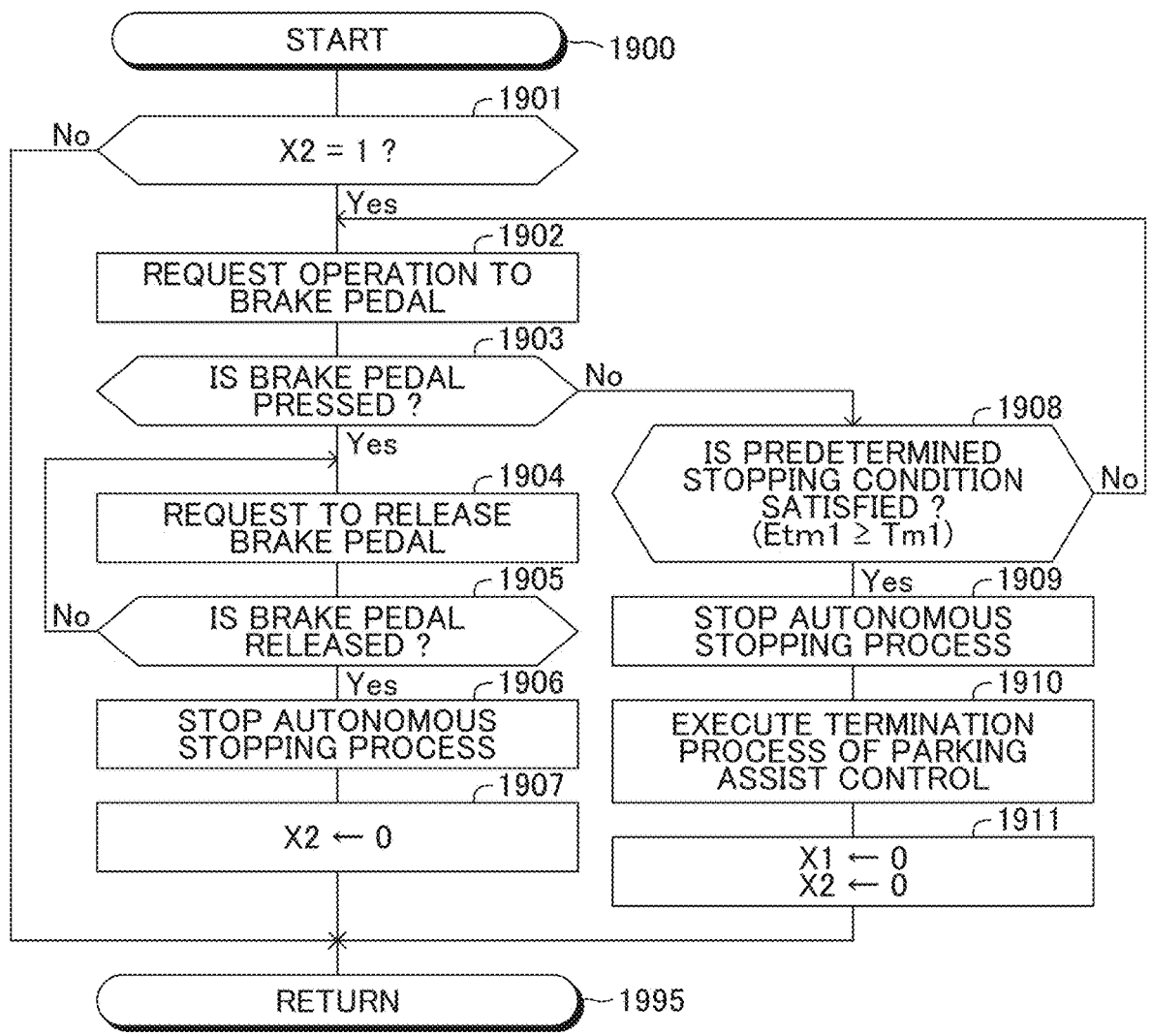
FIG. 19 is a view which shows a flowchart of a suspending routine executed by the CPU.

Further, at a predetermined timing, the CPU starts a process from a step 1900 of the routine shown in FIG. 19 and proceeds with the process to a step 1901 to determine whether the value of the second flag X2 is "1". When the value of the second flag X2 is not "1", the CPU determines "No" at the step 1901 and proceeds with the process directly to a step 1995 to terminate executing this routine once.

On the other hand, when the value of the second flag X2 is set to "1" in the routine shown in FIG. 18, and the execution of the parking assist control is suspended, the CPU determines "Yes" at the step 1901 and proceeds with the process to a step 1902 to request the resuming operation (i.e. the operation applied to the brake pedal 31*a*). As shown in FIG. 15, the CPU displays the message 1501 in the third displaying area 303 of the assist mode screen image and outputs the message 1501 from the speaker 83.

Then, the CPU proceeds with the process to a step 1903 to determine whether the driver presses the brake pedal 31*a*. When the driver presses the brake pedal 31*a*, the CPU determines "Yes" at the step 1903 and proceeds with the process to a step 1904 to request the driver to release the brake pedal 31*a*. As shown in FIG. 16, the CPU displays the message 1601 in the third displaying area 303 of the assist mode screen image and outputs the message 1601 from the speaker 83.

Then, the CPU proceeds with the process to a step 1905 to determine whether the brake pedal 31*a* is released. When the brake pedal 31*a* is not released, the CPU returns the process to the step 1904.

On the other hand, when the brake pedal 31*a* is released, the CPU determines "Yes" at the step 1905 and sequentially executes processes of steps 1906 and 1907 described below. Then, the CPU proceeds with the process to the step 1995 to terminate executing this routine once.

Step 1906: The CPU stops the execution of the autonomous stopping process.

Step 1907: The CPU sets the value of the second flag X2 to "0". Thereby, the CPU determines "Yes" at the step 1801 of the routine shown in FIG. 18. Thus, the execution of the parking assist control is resumed.

When the driver does not press the brake pedal 31*a* at a point of time when the CPU proceeds with the process to the step 1903, the CPU determines "No" at the step 1903 and proceeds with the process to a step 1908. The CPU determines whether a predetermined stopping condition or a predetermined cancelling condition is satisfied. The predetermined stopping condition becomes satisfied when an elapsing time Etm1 since the process of the step 1902 is first executed, becomes equal to or longer than a predetermined first time threshold Tm1. When the predetermined stopping condition is not satisfied, the CPU determines "No" at the step 1908 and returns the process to the step 1902.

When the predetermined stopping condition is satisfied, the CPU determines "Yes" at the step 1908 and sequentially executes processes of steps 1909 to 1911 described below. Then, the CPU proceeds with the process to the step 1995 to terminate executing this routine once.

Step 1909: The CPU stops the execution of the autonomous stopping process.

Step 1910: The CPU executes a predetermined termination process. In particular, the CPU displays, in the third displaying area 303 of the assist mode screen image, a message that the pulling-out assistance (i.e., the parking assist control in the pulling-out mode) is ended and outputs the message from the speaker 83.

Step 1911: The CPU sets the value of the first flag X1 to "0" and sets the value of the second flag X2 to "0". As understood from the above, when the driver does not carry out the resuming operation, the execution of the parking assist control is terminated.

Figure 20:
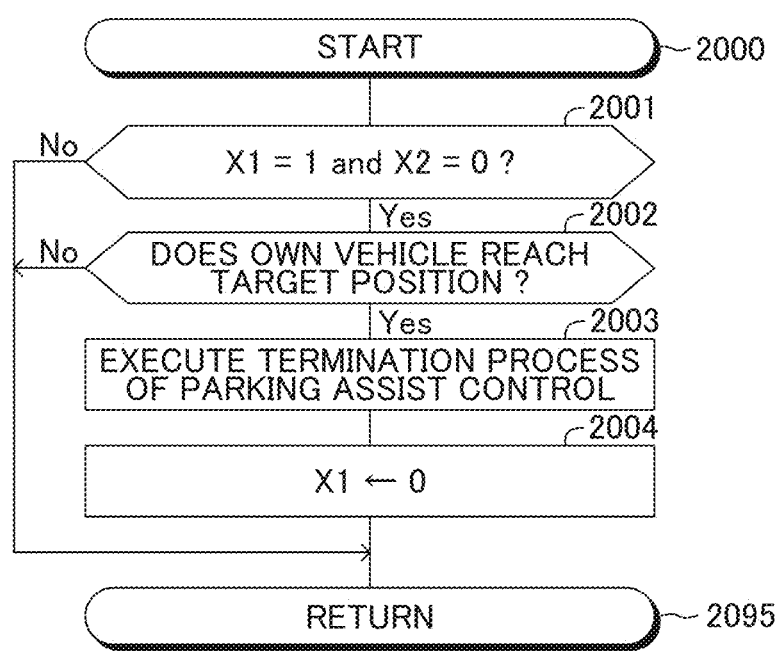
FIG. 20 is a view which shows a flowchart of a parking assist control termination routine executed by the CPU.

Further, at a predetermined timing, the CPU starts a process from a step 2000 of the routine shown in FIG. 20 and proceeds with the process to a step 2001 to determine whether the value of the first flag X1 is "1", and the value of the second flag X2 is "0". When the value of the first flag X1 is "0", or the value of the second flag X2 is "1", the CPU determines "No" at the step 2001 and proceeds with the process directly to a step 2095 to terminate executing this routine once.

On the other hand, when the value of the first flag X1 is "1", and the value of the second flag X2 is "0", the CPU determines "Yes" at the step 2001 and proceeds with the process to a step 2002 to determine whether the center position of the own vehicle SV reaches the target position Ptgt. When the center position of the own vehicle SV does not reach the target position Ptgt, the CPU determines "No" at the step 2002 and proceeds with the process directly to the step 2095 to terminate executing this routine once.

When the center position of the own vehicle SV reaches the target position Ptgt, the CPU determines "Yes" at the step 2002 and sequentially executes processes of steps 2003 and 2004 described below. Then, the CPU proceeds with the process to the step 2095 to terminate executing this routine once.

Step 2003: The CPU executes the predetermined termination process. In particular, the CPU displays, in the third displaying area 303 of the assist mode screen image, a message representing that the pulling-out assistance is ended and outputs the message from the speaker 83.

Step 2004: The CPU sets the value of the first flag X1 to "0".

According to the configuration described above, the parking assist apparatus changes the stopping number of stopping the own vehicle SV while the parking assist apparatus moves the own vehicle SV along the moving route MP, depending on the surrounding situation around the own vehicle SV within a range of zero to two. Thus, the driver can be prevented from feeling bothersome, and the driver can be provided with chances to confirm the situation of the traffic lane RD.

When the current situation is the first situation, the parking assist apparatus stops the own vehicle SV twice. Further, the parking assist apparatus stops the own vehicle SV when the vehicle end portion SVa reaches a position forward from the first end portion OB1*a* by the predetermined positive distance ds and stops the own vehicle SV when the vehicle end portion SVa reaches a position forward from the second end portion OB2a by the predetermined positive distance ds. Thus, the driver can surely confirm the situation of the traffic lane RD.

When the current situation is the second situation, the parking assist apparatus stops the own vehicle SV once at a position at which the driver can confirm the objects (OB3 and OB4) which approach the own vehicle SV from the left side and the right side of the own vehicle SV. Even when the own vehicle SV is stopped once, the driver can surely confirm the situation of the traffic lane RD. Thus, the driver can be prevented from feeling bothersome, and the driver can be provided with chances to confirm the situation of the traffic lane RD.

When the current situation is the third situation, the driver can surely confirm the situation of the traffic lane RD at a point of time when the execution of the parking assist control is started. Thus, the parking assist apparatus does not stop the own vehicle SV. Thus, the driver can be prevented from feeling bothersome.

It should be noted that the invention is not limited to the aforementioned embodiments, and various modifications can be employed within the scope of the invention.

Modified Example 1

In the embodiment described above, the CPU sets the stopping positions on the moving route MP before the execution of the parking assist control is started (the step 1710), but the invention is not limited thereto. The CPU may be configured to set the first stopping position Ps1 and the second stopping position Ps2, based on the vehicle surrounding information after the CPU starts the execution of the parking assist control.

Modified Example 2

The parking assist ECU 10 may be configured to set the stopping number and the stopping positions in consideration of the scope on the traffic lane RD which the cameras 72 (for example, the camera 72a) can take images (hereinafter, will be referred to as "field-of-view scope of the cameras 72"). In this case, the parking assist ECU 10 may be configured to request the driver to confirm the perspective image 401 and the moving direction image 402 of the assist mode screen image at a point of time when the parking assist ECU 10 stops the own vehicle SV at the stopping position (Ps1, Ps2). The predetermined positive distance ds may be set such that the field-of-view scope of the cameras 72 is not interrupted by the first object OB1 or the second object OB2. With this configuration, the predetermined positive distance ds can be set to a smaller value, compared with when the driver confirms the situation of the traffic lane RD. Thus, safety can be improved.

Modified Example 3

The resuming operation is not limited to one described above and may be another operation. The resuming operation may be an operation applied to a switch provided near the steering wheel SW. Alternatively, the resuming operation may be an operation applied to a button displayed on the touch panel 63. Alternatively, the resuming operation may be an operation applied to the parking assist switch 82.

Modified Example 4

The parking assist control at least includes the steering angle control, the driving force control, and the braking force control. That is, the parking assist control may not include the shift control. When the parking assist control does not include the shift control, the CPU informs the driver of the shift position of the transmission 24 by the assist mode screen image on the touch panel 63 and/or the speaker 83 after the step 1711 of the routine shown in FIG. 17. When the driver operates the shift lever and sets the shift position to the informed shift position, the CPU proceeds with the process to the step 1712 to set the value of the first flag X1 to "1".

What is claimed is:

1. A parking assist apparatus, comprising:
an information acquiring apparatus which acquires vehicle surrounding information including information on objects around an own vehicle which is parked; and
an electronic control unit which is configured to:
in response to an assistance request being generated, set a target position on a traffic lane, based on the vehicle surrounding information;
calculate a moving route from a current position of the own vehicle to the target position on the traffic lane;
set a stopping number of stopping points of the own vehicle along the moving route; and
after the moving route is calculated and the stopping number is set, execute a parking assist control of moving the own vehicle along the moving route,
the parking assist control including (i) a steering angle control of changing a steering angle of the own vehicle, (ii) a driving force control of controlling driving force of the own vehicle, and (iii) a braking force control of controlling braking force of the own vehicle,
wherein the electronic control unit is configured to change the stopping number of stopping points of the own vehicle, based on the vehicle surrounding information while the electronic control unit moves the own vehicle along the moving route,
wherein the electronic control unit is configured to:
detect a first object to a first side of the own vehicle, based on the vehicle surrounding information, the first side being one of the right side and the left side of the own vehicle;
detect a second object to a second side of the own vehicle, based on the vehicle surrounding information, the second side being the other of the right side and the left side of the own vehicle; and
change the stopping number, based on a positional relationship between (i) a vehicle end portion which is an end portion of the own vehicle at the side of the traffic lane, (ii) a first end portion which is an end portion of the first object at the side of the traffic lane, and (iii) a second end portion which is an end portion of the second object at the side of the traffic lane.

2. The parking assist apparatus as set forth in claim 1, wherein:
the electronic control unit is configured to set the stopping number to two when the electronic control unit determines, based on the positional relationship, that a current situation is a first situation;
the first situation includes a situation that (i) the first object and the second object interrupt a field of view from the own vehicle, and (ii) a distance in a longitudinal direction of the own vehicle between the first end portion and the second end portion is longer than a predetermined threshold; and
the electronic control unit is configured to:
stop the own vehicle when the vehicle end portion reaches a position forward by a predetermined distance from the first end portion while the electronic control unit moves the own vehicle along the moving route; and stop the own vehicle when the vehicle end portion reaches a position forward by the predetermined distance from the second end portion while the electronic control unit moves the own vehicle along the moving route.

3. The parking assist apparatus as set forth in claim 1, wherein:

the electronic control unit is configured to set the stopping number to one when the electronic control unit determines, based on the positional relationship, that a current situation is a second situation;

the second situation includes (i) a situation that the first object and the second object interrupt a field of view from the own vehicle, and a distance in a longitudinal direction of the own vehicle between the first end portion and the second end portion is equal to or smaller than a predetermined threshold, and (i) a situation that only the first object interrupts the field of view from the own vehicle; and the electronic control unit is configured to stop the own vehicle when the vehicle end portion reaches a position forward by a predetermined distance from the first end portion while the electronic control unit moves the own vehicle along the moving route.

4. The parking assist apparatus as set forth in claim 1, wherein:

the electronic control unit is configured to set the stopping number to zero when the electronic control unit determines, based on the positional relationship, that a current situation is a third situation; and the third situation includes a situation that the first object and the second object do not interrupt a field of view from the own vehicle.

5. The parking assist apparatus as set forth in claim 1, wherein the electronic control unit is configured to calculate, as the positional relationship, (i) a first distance in a longitudinal direction of the own vehicle between the vehicle end portion and the first end portion, (ii) a second distance in the longitudinal direction of the own vehicle between the vehicle end portion and the second end portion, and (iii) a third distance in the longitudinal direction of the own vehicle between the first end portion and the second end portion.

6. The parking assist apparatus as set forth in claim 1, wherein the moving route is from the current position of the own vehicle, which is a parked position in a parking space, to the target position on the traffic lane.

7. The parking assist as set forth in claim 6, wherein the parking assist control is a pulling-out mode that moves the own vehicle from the parked position in the parking space to the traffic lane.

* * * * *